(12) United States Patent
Meier et al.

(10) Patent No.: US 7,109,313 B2
(45) Date of Patent: Sep. 19, 2006

(54) WATER-SOLUBLE REACTIVE MONO- AND DI-AZO DYES

(75) Inventors: Stefan Meier, Frankfurt am Main (DE); Werner Russ, Flörsheim-Wicker (DE); Stefan Ehrenberg, Hattersheim (DE)

(73) Assignee: DyStar Textilfarben GmbH & Co. Deutschland KG, (DE)

( * ) Notice: Subject to any disclaimer, the term of this patent is extended or adjusted under 35 U.S.C. 154(b) by 113 days.

(21) Appl. No.: 10/508,121

(22) PCT Filed: Mar. 18, 2003

(86) PCT No.: PCT/EP03/02794

§ 371 (c)(1),
(2), (4) Date: Nov. 5, 2004

(87) PCT Pub. No.: WO03/080738

PCT Pub. Date: Oct. 2, 2003

(65) Prior Publication Data

US 2005/0148764 A1 Jul. 7, 2005

(30) Foreign Application Priority Data

Mar. 22, 2002 (DE) ................. 102 12 771

(51) Int. Cl.
*C09B 62/006* (2006.01)
*C09B 62/008* (2006.01)
*C09B 62/01* (2006.01)

(52) U.S. Cl. ............... 534/633; 534/634; 534/637; 534/638; 534/641; 534/642; 534/643; 8/543; 8/549

(58) Field of Classification Search ............ 534/633, 534/634, 637, 638, 641, 642, 643; 8/543, 8/549
See application file for complete search history.

(56) References Cited

U.S. PATENT DOCUMENTS 5,817,779 A 10/1998 Deitz et al.

FOREIGN PATENT DOCUMENTS

| EP | 0 785 237 | 7/1997 |
|---|---|---|
| JP | 60-243157 | 12/1985 |
| JP | 61-057650 | * 3/1986 |
| JP | 6-157650 | 6/1994 |

* cited by examiner

*Primary Examiner*—Fiona T. Powers
(74) *Attorney, Agent, or Firm*—Connolly Bove Lodge & Hutz

(57) ABSTRACT

The present invention relates to dyes of the general formula (I)

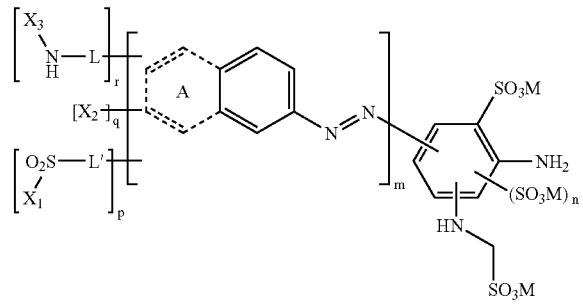

where
$X_1$ is a radical $-CH_2CH_2Z$ or $-CH=CH_2$, Z being an alkali-eliminable group,
$X_2$ is alkyl, alkoxy, halogen, COOM or $SO_3M$,
$X_3$ is a heterocyclic reactive group of the general formula (IIa) or (IIb)

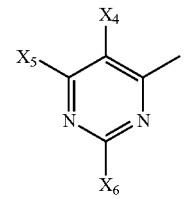

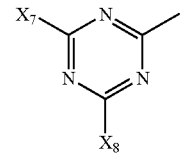

or a reactive group of the formula (IIc), (IId) or (IIe)

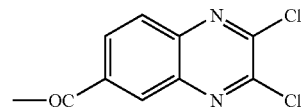

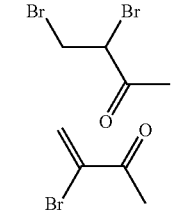

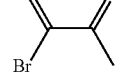

the stated variables being as defined in claim 1, to processes for preparing them and to their use for dyeing and printing hydroxyl-containing and/or carboxamido-containing material.

14 Claims, No Drawings

WATER-SOLUBLE REACTIVE MONO- AND DI-AZO DYES

The present invention is situated within the field of fiber-reactive dyes. EP-A 785 237 discloses reactive dyes comprising the structural element

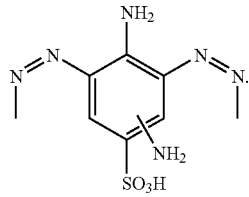

The present invention now provides dyes of the general formula (I)

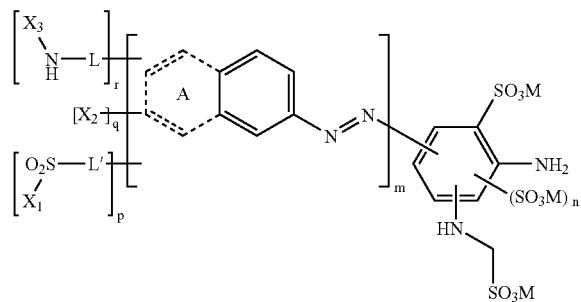

where
m is 1 or 2,
n is 0 or 1
q is 0, 1, 2 or 3 and
p is 0, 1 or 2,
r is 0, 1 or 2, and
p+r is 1 or 2 and
$X_1$ is a radical —$CH_2CH_2Z$ or —CH=$CH_2$, Z being an alkali-eliminable group,
M is hydrogen, ammonium, an alkali metal or the equivalent of an alkaline earth metal,
$X_2$ is alkyl, alkoxy, halogen, COOM or $SO_3M$,
L is a direct bond or alkylene,
L' is a direct bond or a group of the formula

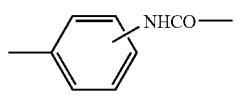

$X_3$ is a heterocyclic reactive group of the general formula (IIa) or (IIb)

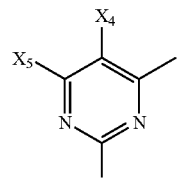

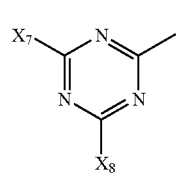

or a reactive group of the formula (IIc), (IId) or (IIe)

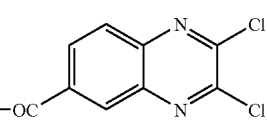

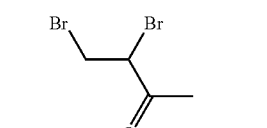

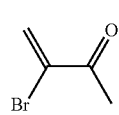

where
$X_4$ to $X_6$ independently are hydrogen or halogen, with the proviso that at least one radical $X_4$ to $X_6$ is halogen,
$X_7$ is halogen or $X_8$, and
$X_8$ is a substituent of the general formula (III)

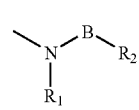

where
$R_1$ is hydrogen, alkyl or aryl,
B is alkylene, oxygen-interrupted alkylene, arylene or arylalkylene, and
$R_2$ is a radical $SO_3M$, $SO_2$—$CH_2CH_2Z$ or $SO_2$—CH=$CH_2$, in which Z is as defined above
and the ring labeled A is either absent or present.

In the compound of the general formula (I) an alkali metal M can be in particular lithium, sodium or potassium, while calcium is a particularly suitable alkaline earth metal. Preferably M is hydrogen or sodium.

Halogen $X_2$, $X_4$ to $X_6$, and $X_7$ is in particular fluorine or chlorine.

Alkyl $R_1$ or $X_2$ is preferably $C_1$–$C_8$ alkyl and more preferably $C_1$–$C_4$ alkyl. Examples of such alkyl groups are methyl, ethyl, n-propyl, isopropyl, n-butyl, isobutyl, sec-butyl and tert-butyl. Especially preferred alkyl groups are methyl and ethyl. Similar comments apply to alkoxy $R_1$ or $X_2$. Especially preferred alkoxy groups, therefore, are methoxy and ethoxy.

Aryl $R_1$ is in particular phenyl, which may also be substituted one or more times by, for example, $C_1$–$C_4$ alkyl, $C_1$–$C_4$ alkoxy, chloro, fluoro or the $SO_3H$ group. Alkylene B or L is preferably $C_1$–$C_8$ alkylene and more preferably $C_1$–$C_4$ alkylene. Examples of such alkylene groups are methylene, ethylene, n-propylene, isopropylene, and butylene. Oxygen-interrupted alkylene is in particular —$(CH_2)_u$—O—$(CH_2)_v$—, in which u and v independently are numbers from 1 to 3.

Arylene B is in particular phenylene and naphthylene, preference being given to meta- and para-phenylene.

Arylalkylene B is preferably a group of the general formula (IVa) or (IVb)

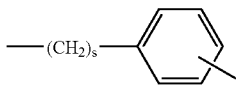

(IVa)

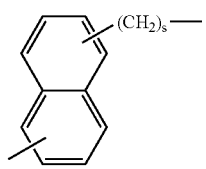

(IVb)

where s is a number from 1 to 4 and the free bond on the aromatic nucleus may be attached either to N or to $R_2$.

Alkali-eliminable radicals Z, i.e., radicals Z which can be eliminated under dyeing conditions, include for example chloro, bromo, sulfato, thiosulfato, phosphato, $C_2$–$C_5$ alkanoyloxy such as acetyloxy, for example, benzoyloxy, sulfobenzoyloxy or p-tolylsulfonyloxy, preference being given to sulfato.

The groups, "sulfato", "thiosulfato" and "phosphato" include both the acid form and the salt form. Accordingly, thiosulfato groups have the general formula —S—$SO_3M$, phosphato groups the general formula —$OPO_3M_2$ and sulfato groups have the general formula —$OSO_3M$, in which M is as defined above.

Preferred compounds of the general formula (I) meet the condition p+r=1, while paricularly preferred compounds of the general formula (I) meet the condition p+r=2. If m=1 then preferably p+r=1.

$X_2$ is preferably $C_1$–$C_4$ alkyl, $C_1$–$C_4$ alkoxy or $SO_3M$ and more preferably methyl, ethyl, methoxy, ethoxy or $SO_3M$, in which M is hydrogen or sodium.

L and L' are preferably each a direct bond.

$X_3$ is preferably a group of the formula

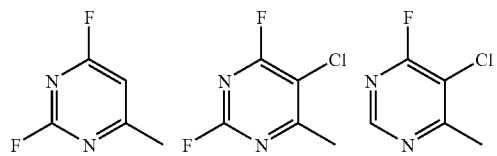

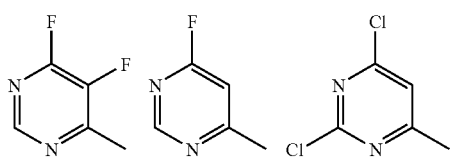

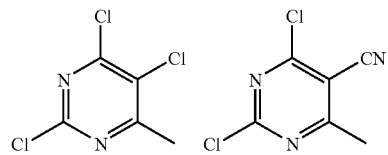

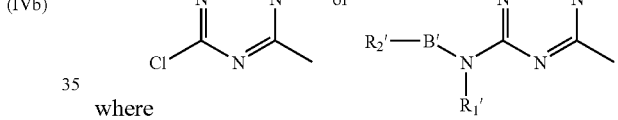

where
Hal' is chloro or bromo,
$R_1'$ is hydrogen, methyl, ethyl or phenyl,
B' is ethylene, propylene or —$CH_2CH_2$—O—$CH_2CH_2$- and
$R_2'$ is —$SO_2CH_2CH_2OSO_3M$ or —$SO_2CH$=$CH_2$.

If r is 2 then the radicals $X_3$ may have identical or different meanings. Similarly, the radicals $X_2$ may have identical or different meanings if q is 2 or 3 and the radicals $X_1$ may have identical or different meanings if p is 2.

Particularly preferred dyes of the general formula (I) correspond to the general formula (Ia)

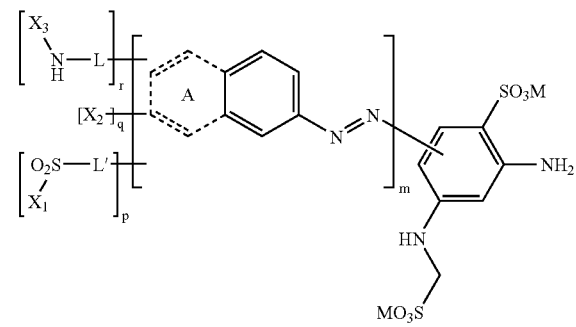

(Ia)

where $X_1$ to $X_3$, A, L, L', M, m, r, p and q are as defined above.

Particularly preferred dyes of the general formula (I) correspond, moreover, to the general formula (Ib)

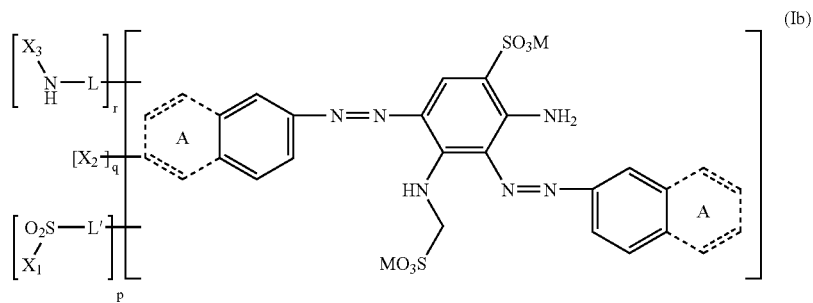

where $X_1$ to $X_3$, A, L, L', M, r, p and q are as defined above.

Particularly preferred dyes of the general formula (I) correspond, furthermore, to the general formula (Ic)

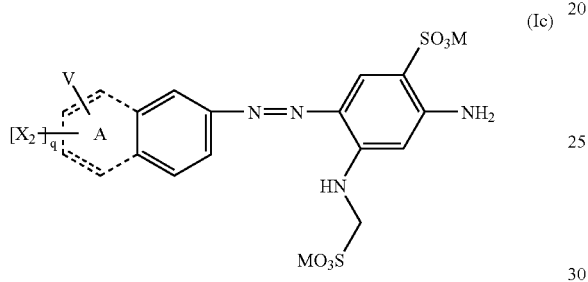

where M, $X_2$ and q are as defined above and V is $X_3$—NH-L- or $X_1$—$O_2$S-L'-, where $X_1$, $X_3$, A, L and L' are as defined above.

Especially preferred dyes of the general formula (I) correspond to the following general formulae (Id) to (Iq)

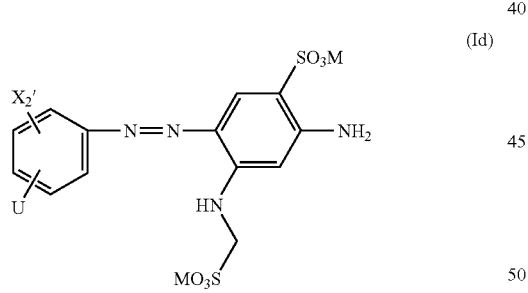

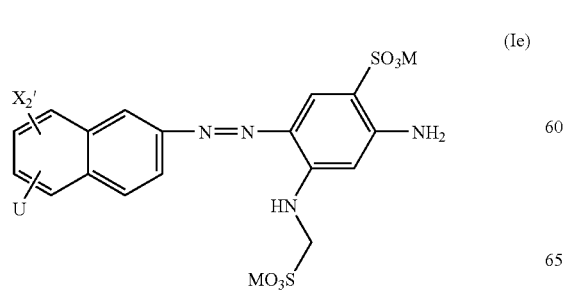

-continued

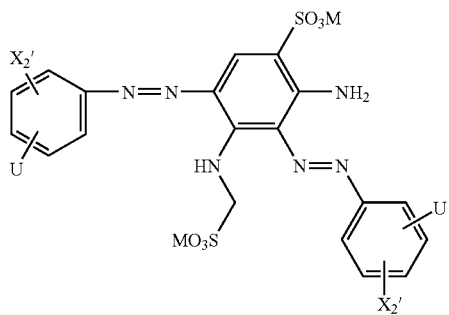

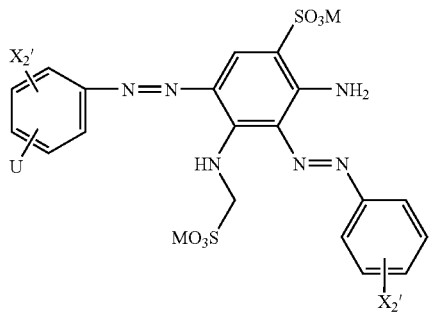

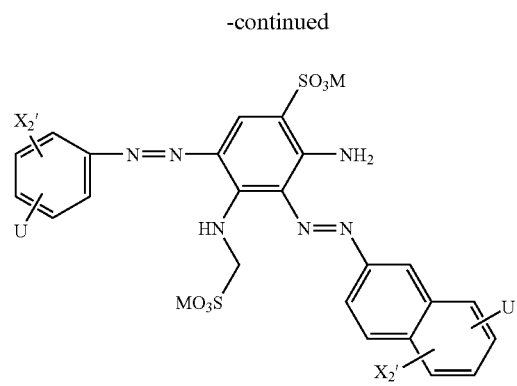
(Ii)
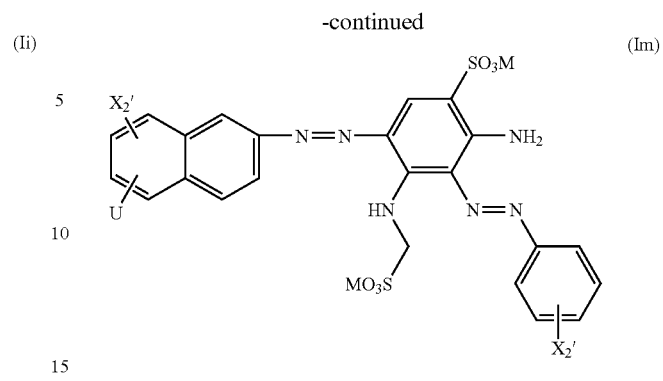
(Im)
(Ij)
(In)
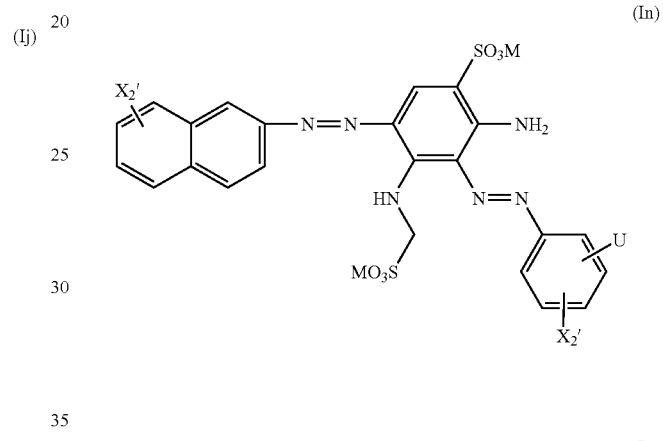
(Ik)
(Io)
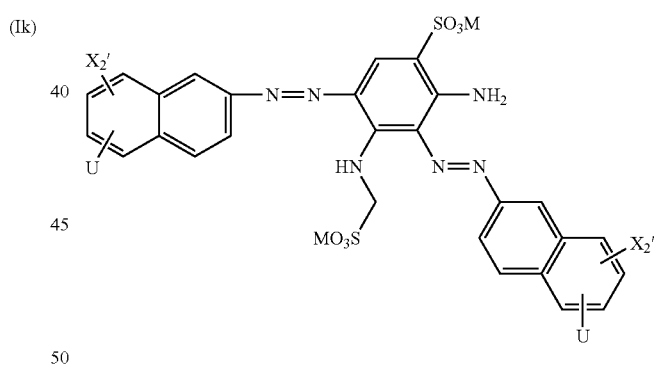
(Il)
(Ip)
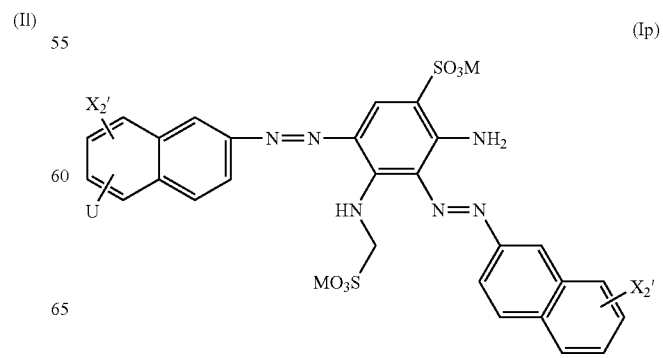

(Iq)

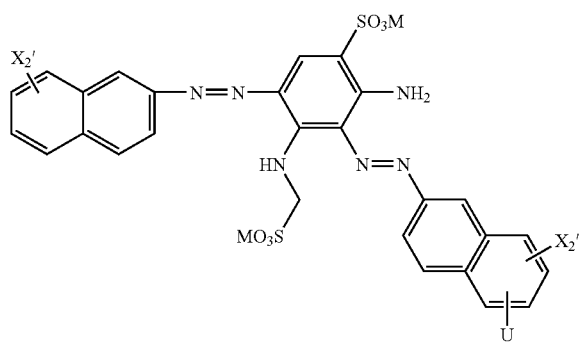

where in each case
M is hydrogen or sodium and
$X_2'$ is hydrogen, methyl, ethyl, methoxy, ethoxy, COOM or $SO_3M$ and
U is $-SO_2CH_2CH_2OSO_3M$, $-SO_2CH=CH_2$ or $-NH-U'$, in which M is hydrogen or sodium and U' is one of the formulae

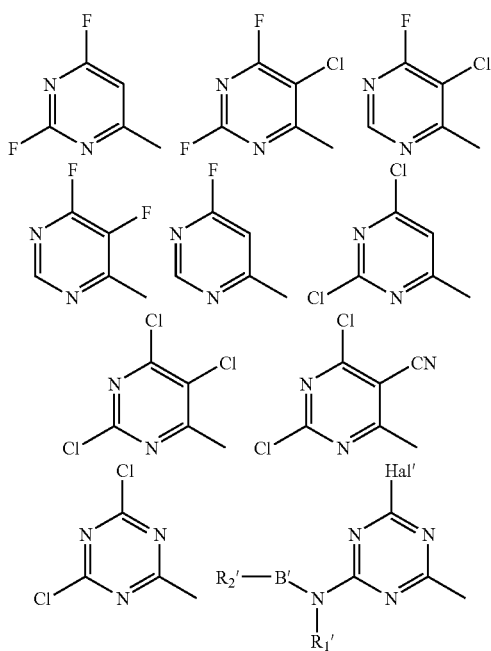

where
Hal' is chloro or fluoro,
$R_1'$ is hydrogen, methyl, ethyl or phenyl,
B' is ethylene, propylene or $-CH_2CH_2-O-CH_2CH_2-$ and
$R_2'$ is $-SO_2CH_2CH_2OSO_3M$ or $-SO_2CH=CH_2$.

The dyes of the general formula (I) according to the invention are generally in the form of preparations in solid or liquid (dissolved) form. In solid form they generally include the electrolyte salts which are customary for water-soluble and especially fiber-reactive dyes, such as sodium chloride, potassium chloride and sodium sulfate, and may further include the assistants customary in commercial dyes, such as buffer substances with the capacity to set a pH in aqueous solution of between 3 and 7, such as sodium acetate, sodium borate, sodium hydrogen carbonate, sodium dihydrogen phosphate, sodium tricitrate, and disodium hydrogen phosphate, small amounts of siccatives or, if they are in liquid, aqueous solution (including the thickener content customary in the case of printing pastes), substances which ensure the durability of said preparations, such as mold preventatives, for example. The dyes of the general formula (I) according to the invention are preferably in the form of dye powders or dye granules containing from 10 to 80% by weight, based on the powder or granules, of an electrolyte salt, also referred to as a standardizer. Granules have grain sizes in particular of from 50 to 500 μm. These solid preparations may further comprise the abovementioned buffer substances in a total amount of up to 10% by weight, based on the preparation. Where the dyes are in aqueous solution, the total dye content of such aqueous solutions is up to about 50% by weight, such as between 5 and 50% by weight, for example, with the electrolyte salt content of these aqueous solutions being preferably below 10% by weight, based on the aqueous solution. The aqueous solutions (liquid preparations) may comprise the abovementioned buffer substances, in general, in an amount of up to 10% by weight, preferably up to 2% by weight.

Dyes of the general formula (I) where p≠0 and/or those containing a group of the formula (IIb) in which $X_8$ is a group of the formula (III), while having the same chromophore, may possess a different structure in respect of the fiber-reactive group $SO_2X_1$ and/or $R_2$. In particular, with the same chromophore, $SO_2X_1$ and $R_2$ may on the one hand be $-SO_2CH=CH_2$ and on the other $-SO_2CH_2CH_2Z$, with particular preference β-sulfatoethylsulfonyl. The fraction of the dye in vinylsulfonyl form may be up to about 30 mol %, based on the respective dye chromophore. The molar ratio between the vinylsulfonyl dye fraction and the β-ethyl-substituted dye fraction is preferably between 5:95 and 30:70.

The dyes of the general formula I according to the invention may be prepared, for example, by diazotizing an aromatic amine of the general formula (V)

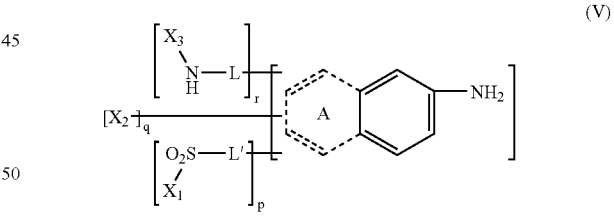

where p, q, r, A, L, $X_1$, $X_2$ and $X_3$ are as defined above and coupling the diazonium compound with a compound of the general formula (VI)

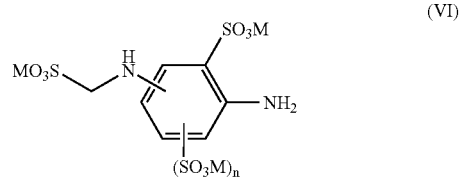

Using one equivalent of compound of the general formula (V) in this preparation process per equivalent of compound of the general formula (VI) produces dyes of the general formula (I) according to the invention in which m is 1. Alternatively, using two equivalents of compound of the general formula (V) per equivalent of compound of the general formula (VI) produces dyes of the general formula (I) according to the invention in which m is 2.

Where the intention is to prepare a compound of the general formula (I) according to the invention in which m is 2, the condition p+r=1 or 2 is not met in the aromatic compounds of the general formula (V). Instead, p and r are to be chosen such that the resulting compound of the general formula (I) according to the invention meets the condition p+r=1 or 2.

In one preferred embodiment of the preparation process according to the invention first one equivalent of aromatic amine of the general formula (V) is diazotized and the diazonium compound is coupled with one equivalent of a compound of the general formula (VIa)

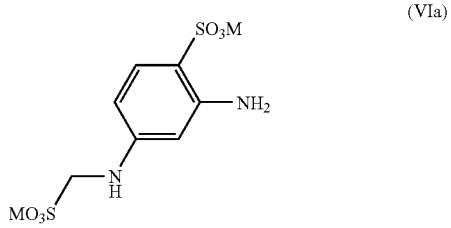

(VIa)

where M is as defined above in the pH range between 0 and 6, preferably between 1 and 4. The resultant monoazo dyes correspond to the general formula (Ir)

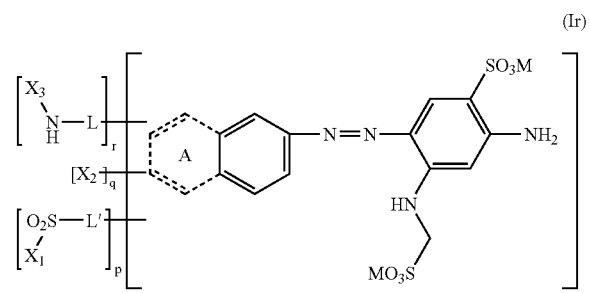

(Ir)

where p, q, r, A, L, $X_1$, $X_2$, $X_3$ and M are as defined above.

The dyes of the general formula (Ir) dye cotton in golden yellow to reddish yellow shades with good all-round fastness properties.

The dyes of the general formula (Ir) can then if desired be reacted with a second equivalent of the aromatic amine of the general formula (V), diazotized beforehand by known methods, to give disazo dyes of the general formula (Ia) or (Ib).

In the preparation according to the invention of compounds of the general formula (I) in which m is 2 the two equivalents of aromatic amine may be the same or different in respect of the variables p, q, r, L, L', $X_1$, $X_2$ and $X_3$.

If the two equivalents of aromatic amine are the same in respect of the variables p, q, r, L, L', $X_1$, $X_2$ and $X_3$ then it is particularly preferred to perform the reaction in a one-pot process ("one-pot coupling"). In this case two equivalents of the aromatic amine of the general formula (V) are diazotized and the diazonium compound is coupled with one equivalent of the compound of the general formula (VI).

The compounds of the general formula (I) according to the invention that are obtained by one-pot coupling are identical with the compounds obtained by "serial coupling": that is, by twofold successive coupled attachment of in each case one equivalent of aromatic amine of the general formula (V) of the same chemical structure.

Dyes of the general formula (I) according to the invention in which m is 2 and p+r=1 may be prepared by diazotizing an aromatic amine of the general formula (V) in which p+r=0 and reacting the diazonium compound with a compound of the general formula (VI) to give a compound of the general formula (VII)

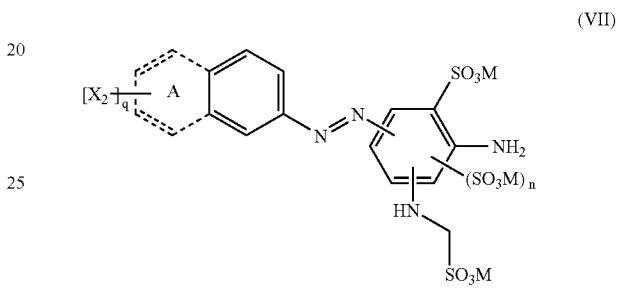

(VII)

where q, n, A, $X_2$ and M are as defined above. Then, in a second step, an aromatic amine of the general formula (V) in which p+r=1 is diazotized and the diazonium compound is coupled further with the compound of the general formula (VII) to give the disazo dye according to the invention.

Conversely it is also possible, of course, first to diazotize an aromatic amine of the general formula (V) in which p+r=1 and to couple the diazonium compound with a compound of the general formula (VI) to give dyes of the general formula (Is) according to the invention

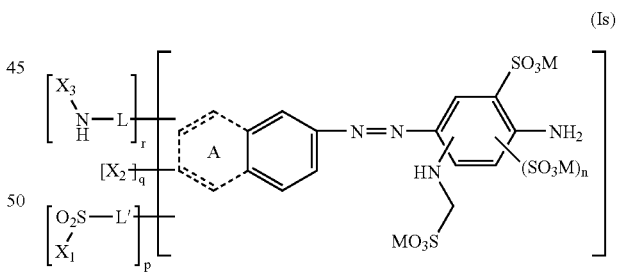

(Is)

where n, p, q, r, A, L, $X_1$, $X_2$, $X_3$ and M are as defined above and in which p+r=1. Then, in the second step, an aromatic amine of the general formula (V) in which p+r=0 is diazotized and the diazonium compound is subjected to further coupling to give the disazo dye according to the invention. In both cases monofunctional disazo reactive dyes are obtained which, given an appropriate choice of first and second diazo component, are isomeric with one another.

Preferred aromatic amines of the general formula (V) in which p+r=0 are aniline derivatives or naphthylamine derivatives, but especially their sulfonic acids.

Examples that may be mentioned include aniline-2-sulfonic acid, aniline-3-sulfonic acid, aniline-4-sulfonic acid, 4-methylaniline-2-sulfonic acid, 4-methylaniline-3-sulfonic acid, 4-methylaniline-2,5-disulfonic acid, 4-methoxyaniline-2-sulfonic acid, 4-methoxyaniline-2,5-disulfonic acid, 2-chloroaniline-5-sulfonic acid, 2-chloroaniline-4-sulfonic acid, 2-methoxy-5-methylaniline-4-sulfonic acid, 2,5-dimethoxyaniline-4-sulfonic acid, aniline-2,4-disulfonic acid, aniline-2,5-disulfonic acid, 2-methoxyaniline-5-sulfonic acid, 1-aminonaphthalene-2-sulfonic acid, 1-aminonaphthalene-3-sulfonic acid, 1-aminonaphthalene-4-sulfonic acid, 1-aminonaphthalene-5-sulfonic acid, 1-aminonaphthalene-6-sulfonic acid, 1-aminonaphthalene-7-sulfonic acid, 1-aminonaphthalene-8-sulfonic acid, 1-aminonaphthalene-3,6-disulfonic acid, 1-aminonaphthalene-3,7-disulfonic acid, 1-aminonaphthalene-4,8-disulfonic acid, 2-aminonaphthalene-1-sulfonic acid, 2-aminonaphthalene-5-sulfonic acid, 2-aminonaphthalene-6-sulfonic acid, 2-aminonaphthalene-7-sulfonic acid, 2-aminonaphthalene-8-sulfonic acid, 2-aminonaphthalene-1,5-disulfonic acid, 2-aminonaphthalene-4,8-disulfonic acid, 2-aminonaphthalene-5,7-disulfonic acid, 2-aminonaphthalene-6,8-disulfonic acid, 2-aminonaphthalene-3,6-disulfonic acid, 2-aminonaphthalene-1,5,7-trisulfonic acid and 2-aminonaphthalene-3,6,8-trisulfonic acid.

Preferred aromatic amines of the general formula (V) in which $p+r \neq 0$ correspond to the aforementioned compounds but additionally carry the corresponding number of substituents -L'—$SO_2X_1$ and/or -L—NH—$H_3$.

The diazotization and coupling reactions needed to prepare the dyes of the general formula (I) are known per se to the skilled worker and can be performed in conventional manner as described thoroughly in the relevant literature. In the case of the preparation processes-indicated the dyes of the general formula (I) according to the invention are obtained as solutions or suspensions and can be isolated by salting out, for example. The dyes can also be spray dried, although evaporative concentration of the solution or suspension is a further possibility.

The aromatic amines of the general formula (V) are known per se and can be prepared by methods familiar to the skilled worker.

The compounds of the general formula (VI) have in some instances likewise been described (for example, 3-sulfomethylaminoaniline-6-sulfonic acid in JP 60 243157 and JP 61 57650). They may be prepared, for example, by reacting compounds of the general formula (VIII)

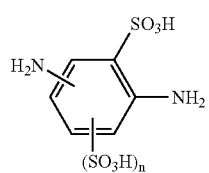

(VIII)

in which n is 0 or 1 with formaldehyde bisulfite of the formula (IX)

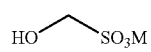

(IX)

where M is as defined above. For this reaction it is customary to add formaldehyde bisulfite to a solution of compound of the general formula (VIII) at a pH of from 3 to 9 and to carry out condensation at a reaction temperature of from 30 to 80° C.

The reactive dyes of the general formula (I) according to the invention possess useful application properties. They are used for dying and printing hydroxyl—and/or carboxamido-containing materials, in the form for example of sheetlike structures, such as paper and leather, or of films, of polyamide, for example, or in bulk, as for example polyamide and polyurethane, but especially in the form of fibers of the materials mentioned. Preferably they are used for dyeing and printing cellulosic fiber materials of any kind. They are additionally suitable for dyeing or printing hydroxyl-containing fibers present in blend fabrics; for example, blends of cotton with polyester fibers or polyamide fibers. It is also possible to use them to print textiles or paper by the inkjet process.

The present invention accordingly also provides for the use of the reactive dyes of the general formula (I) according to the invention for dyeing or printing the materials mentioned and, respectively, provides methods of dyeing or printing such materials in a conventional manner using as colorants one or more reactive dyes of the general formula (I) according to the invention.

Advantageously the as-synthesized solutions of the reactives dyes of the general formula (I) according to the invention may be used directly as a liquid preparation for dyeing, where appropriate following addition of a buffer substance and similarly where appropriate following concentration or dilution.

The materials mentioned are used preferably in the form of fiber materials, particularly in the form of textile fibers, such as wovens or yarns, as in the form of hanks or wound packages.

Hydroxyl-containing materials are those of natural or synthetic origin, examples being cellulose fiber materials or regenerated products thereof and polyvinyl alcohols. Cellulose fiber materials are preferably cotton but also include other plant fibers, such as linen, hemp, jute, and ramie fibers. Regenerated cellulose fibers are, for example, staple viscose and filament viscose.

Carboxamido-containing materials are, for example, synthetic and natural polyamides and polyurethanes, particularly in fiber form, examples being wool and other animal hairs, silk, leather, nylon-6,6, nylon-6, nylon-1 1 and nylon-4.

The reactive dyes of the general formula (I) according to the invention may be applied to and fixed on the substrates mentioned, particularly the fiber materials mentioned, by the application techniques that are known for water-soluble dyes and in particular by the techniques known for fiber-reactive dyes.

For instance, when applied by exhaust dyeing processes to cellulose fibers from a long liquor using any of a wide variety of acid-binding agents with or without neutral salts, such as sodium chloride or sodium sulfate, they produce dyeings with very good color yields. Dyeing is performed preferably in an aqueous bath at temperatures between 40 and 105° C., where appropriate at a temperature up to 130° C. under pressure, and where appropriate in the presence of customary dyeing assistants. One possible procedure in this context is to introduce the material into the warm bath and to heat the bath gradually to the desired dyeing temperature, and to complete the dyeing operation at that temperature. The neutral salts which hasten the exhaustion of the dyes may also, where appropriate, not be added to the bath until the actual dyeing temperature has been reached.

The padding process likewise provides excellent color yields and very good color build on cellulose fibers, in which case fixing can be accomplished conventionally by batching at room temperature or elevated temperature, at up to about 60° C., for example, by steaming or using dry heat.

Similarly, the customary printing processes for cellulose fibers, which can be carried out either in one phase, by printing for example with a print paste comprising sodium bicarbonate or another acid-binding agent and by subsequent steaming at 100 to 103° C., or in two phases, by for example printing with a neutral or weakly acidic print color and by subsequent fixation either by passing the printed material through a hot electrolyte-containing alkaline bath or by overpadding with an alkaline electrolyte-containing padding liquor with subsequent batching or steaming or dry heat treatment of the alkali-overpadded material, produce strong prints having well-defined contours and a clear white ground. The outcome of the prints is largely independent of variations in the fixing conditions.

When fixing by means of dry heat in accordance with the customary thermofix processes use is made of hot air and from 120 to 200° C. Besides the customary steam at 101 to 103° C. it is also possible to use superheated steam and pressurized steam at temperatures of up to 160° C.

The acid-binding agents which bring about the fixation of the dyes on the cellulose fibers include for example water-soluble basic salts of the alkali metals and likewise alkaline earth metals of organic or inorganic acids or compounds which release alkali in the heat. Mention may be made in particular of the alkali metal hydroxides and alkali metal salts of weak to medium-strength organic or inorganic acids, the preferred alkali metal compounds being the sodium and potassium compounds. Examples of such acid-binding agents include sodium hydroxide, potassium hydroxide, sodium carbonate, sodium bicarbonate, potassium carbonate, sodium formate, sodium dihydrogenphosphate, disodium hydrogenphosphate, sodium trichloroacetate, waterglass or trisodiumphosphate. The reactive dyes of the general formula (I) according to the invention are notable for high reactivity, good fixability, very good build, and a high level of fastness to light and to light coupled with perspiration. They can therefore be used in accordance with the exhaust dyeing process at low dyeing temperatures and require only short steaming times in pad-steam processes. The degrees of fixation are high, and the unfixed portions are easily washed off, the difference between the degree of exhaustion and the degree of fixation being remarkably small—that is, the soaping losses being very small. They are also particularly suitable for printing, especially on cotton, but also for printing nitrogenous fibers, such as wool or silk or blend fabrics containing wool or silk.

The reactive dyes of the general formula (I) according to the invention have the further feature that, following the dyeing operation, unfixed dye portions on the fiber material are very easily washed off without whites in the same wash being stained by the dye that becomes detached. This brings advantages of the dyeing operation by saving on wash cycles and hence on costs.

The dyeings and prints produced with the reactive dyes of the general formula (I) according to the invention, especially on cellulose fiber materials, possess high color strength and a high fiber-dye bond stability both in the acidic and in the alkaline range, as well as good light fastness and very good wet fastness properties, such as wash, water, seawater, cross-dyeing, and perspiration fastnesses, and also good fastness to dry heat setting, pleating, and crocking.

The examples below serve to illustrate the invention. The parts and percentages are by weight unless noted otherwise. Parts by weight relate to parts by volume as the kilogram relates to the liter.

The compounds described by formula in the examples are given in the form of the free acid. Generally, however, they are prepared and isolated in the form of their alkali metal salts, such as lithium, sodium or potassium salts, and are used in the form of their salts for dyeing. Similarly, the starting compounds and components specified in free acid form in the following examples, especially tabular examples, can be used in the synthesis as such or in the form of their salts, preferably alkali metal salts.

The absorption maxima ($\lambda_{max}$) in the visible range reported for the dyes according to the invention were measured on aqueous solutions of their alkali metal salts.

EXAMPLE 1

Synthesis of a Compound of the Formula (VI) (Precursor)

18.8 parts of 2,4-diaminobenzenesulfonic acid are suspended in 150 parts of water and converted to a neutral solution by adding 20% strength sodium hydroxide solution. At 20° C., 14.7 g of formaldehyde bisulfite (Na salt) are added and the mixture is heated to 50° C. It is subsequently stirred for 4 hours at a pH from 5.0 to 5.5. The solution obtained is concentrated by evaporation or reacted further directly.

The yellowish residue obtained following evaporative concentration corresponds to the compound of the formula (VIa)

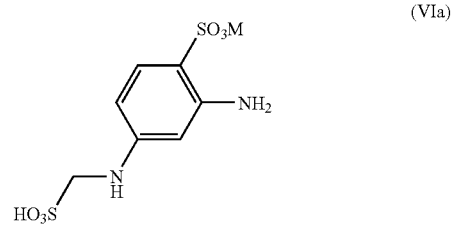

$^1$H-NMR (400 MHz, $d_6$-DMSO): δ (ppm)=3.77 (d, 2 H, $^3$J=6.6 Hz, CH$_2$), 5.28 (s, 2 H, NH$_2$), 5.54 (t, 1 H, $^3$J=6.6 Hz, NH), 5.82 (dd, 1 H, $^3$J=8.1 Hz, $^4$J=2.2 Hz, H$_{ar}$), 5.86 (d, 1 H, $^4$J=2.2 Hz, H$_{ar}$), 7.08 (d, 1 H, $^3$J=8.1 Hz, H$_{ar}$).

EXAMPLE 2

A suspension of 28.1 g of 4-(2'-sulfatoethylsulfonyl) aniline in 200 parts of water is admixed at 15° C. in succession with 0.5 g of a commercial dispersant and 21 parts of 31% strength hydrochloric acid and the mixture is stirred for 15 minutes thereafter. Then 13.2 parts of 40% strength aqueous sodium nitrite solution are added dropwise and the mixture is stirred for 60 minutes more with nitrite in excess. Excess nitrite is then destroyed by adding 10% strength amidosulfuric acid. The suspension of the diazonium salt is then admixed with the solution of the compound of the formula (Via) prepared in Example 1. The pH is then adjusted to 5–6 by adding 15% strength sodium carbonate solution and coupling is completed at 20° C.

Evaporative concentration of the solution gives a dye of the formula (Ie)

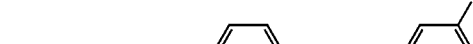

which dyes or prints cotton in reddish yellow shades ($\lambda_{max}$=445 nm) with good fastness properties.

The dyes of Examples (3) to (17) are obtained analogously by diazotizing amines R-NH$_2$ as described in Example 2 and coupling the diazonium compounds with the compound (VIa).

| Ex. | R—NH$_2$ | Coupling component | Shade | $\lambda_{max}$ (nm) |
|---|---|---|---|---|
| 3) | 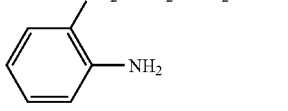 | 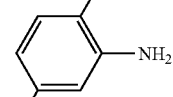 | yellow | 416 |
| 4) |  | 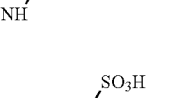 | yellow | 422 |
| 5) | 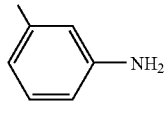 | 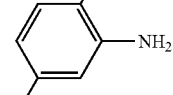 | yellow | 406 |
| 6) |  | 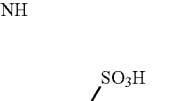 | yellow | 428 |
| 7) |  | 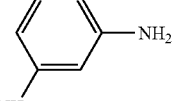 | yellow | 446 |

-continued

| Ex. | R—NH$_2$ | Coupling component | Shade | $\lambda_{max}$ (nm) |
|---|---|---|---|---|
| 8) | HO$_3$SO—CH$_2$—CH$_2$—SO$_2$— (4-position) on benzene with 2-SO$_3$H, 1-NH$_2$ | benzene with SO$_3$H, NH$_2$, HO$_3$SCH$_2$NH | yellow | 412 |
| 9) | HO$_3$SO—CH$_2$—CH$_2$—SO$_2$— (4-position) on benzene with 1-SO$_3$H, 2-NH$_2$ | benzene with SO$_3$H, NH$_2$, HO$_3$SCH$_2$NH | yellow | 409 |
| 10) | HO$_3$SO—CH$_2$—CH$_2$—SO$_2$—C$_6$H$_4$—NH—C(O)—C$_6$H$_4$—NH$_2$ | benzene with SO$_3$H, NH$_2$, HO$_3$SCH$_2$NH | yellow | 407 |
| 11) | HO$_3$SO—CH$_2$—CH$_2$—SO$_2$—C$_6$H$_4$(3-)—NH—C(O)—C$_6$H$_4$—NH$_2$ | benzene with SO$_3$H, NH$_2$, HO$_3$SCH$_2$NH | yellow | 404 |
| 12) | HO$_3$SO—CH$_2$—CH$_2$—SO$_2$—C$_6$H$_4$—NH—C(O)—C$_6$H$_4$(3-NH$_2$) | benzene with SO$_3$H, NH$_2$, HO$_3$SCH$_2$NH | yellow | 408 |
| 13) | HO$_3$SO—CH$_2$—CH$_2$—SO$_2$—C$_6$H$_4$(3-)—NH—C(O)—C$_6$H$_4$(3-NH$_2$) | benzene with SO$_3$H, NH$_2$, HO$_3$SCH$_2$NH | yellow | 405 |
| 14) | HO$_3$SO—CH$_2$—CH$_2$—SO$_2$—naphthyl—NH$_2$ | benzene with SO$_3$H, NH$_2$, HO$_3$SCH$_2$NH | yellow | 436 |
| 15) | HO$_3$SO—CH$_2$—CH$_2$—SO$_2$—naphthyl(SO$_3$H, NH$_2$) | benzene with SO$_3$H, NH$_2$, HO$_3$SCH$_2$NH | yellow | 438 |

| Ex. | R—NH₂ | Coupling component | Shade | λ$_{max}$ (nm) |
|---|---|---|---|---|
| 16) | HO₃SO—CH₂—CH₂—SO₂ attached to 2-amino-naphthalene (8-position) | 4-(HO₃SCH₂NH)-2-amino-benzenesulfonic acid | yellow | 429 |
| 17) | HO₃SO—CH₂—CH₂—SO₂ attached to 2-amino-6-sulfo-naphthalene (8-position) | 4-(HO₃SCH₂NH)-2-amino-benzenesulfonic acid | yellow | 430 |

EXAMPLE 18

18.8 parts of 2,4-diaminobenzenesulfonic acid are suspended in 150 parts of water and converted to a neutral solution by adding lithium hydroxide solution. This solution is cooled to 10° C. and admixed dropwise over one hour with 17.4 parts of 2,4,6-trifluoropyrimidine, a pH of 5.5 being maintained using 15% strength sodium carbonate solution. When the addition is complete the mixture is warmed to 20–25° C. and stirred for an hour thereafter. It is then filtered and 6.9 parts of sodium nitrite are added.

The filtrate is cooled to 10° C. by introduction of ice and is added dropwise over 30 minutes to 100 parts of ice and 60 parts of concentrated hydrochloric acid (31%). This mixture is stirred for an hour and then the excess nitrite is destroyed by adding amidosulfuric acid.

The solution of the compound (VIa) described in Example 1 is then added dropwise to the acid diazotization, after which the pH is adjusted to 5.0–5.5 by adding 15% strength sodium carbonate solution.

The solution obtained is concentrated by evaporation to give a dye of the formula

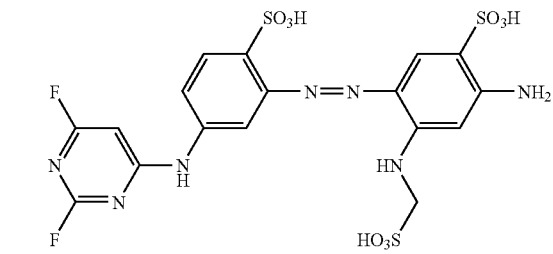

which dyes or prints cotton in yellow shades (λ$_{max}$=406 nm) with good fastness properties.

The dyes of Examples (19) to (32) are obtained analogously by diazotizing and subsequently coupling the amino compounds R-NH₂ indicated in the table below by the method indicated in Example 18.

| Ex. | R—NH₂ | Coupling component | Shade | λ$_{max}$ (nm) |
|---|---|---|---|---|
| 19) | 2,6-difluoro-5-chloro-pyrimidin-4-yl-amino attached to 4-sulfo-3-amino-aniline | 4-(HO₃SCH₂NH)-2-amino-benzenesulfonic acid | yellow | 417 |

-continued
| Ex. | R—NH$_2$ | Coupling component | Shade | $\lambda_{max}$ (nm) |
|---|---|---|---|---|
| 20) | 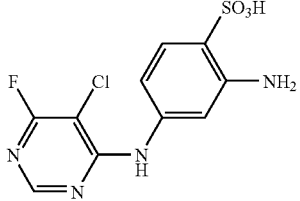 | 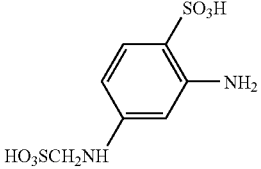 | yellow | 416 |
| 21) | 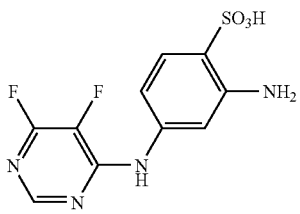 | 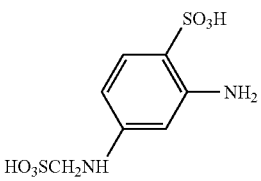 | yellow | 418 |
| 22) | 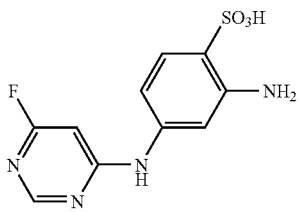 | 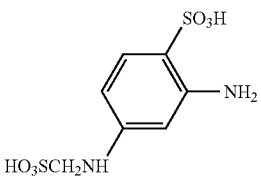 | yellow | 417 |
| 23) | 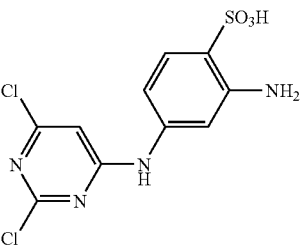 | 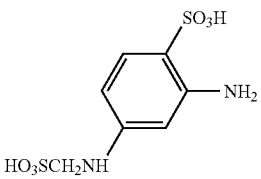 | yellow | 421 |
| 24) | 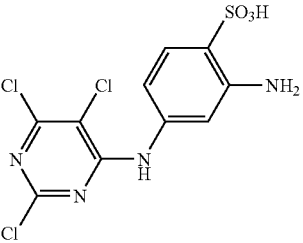 | 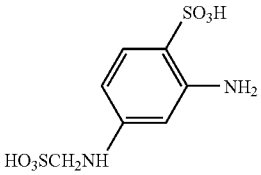 | yellow | 418 |
| 25) | 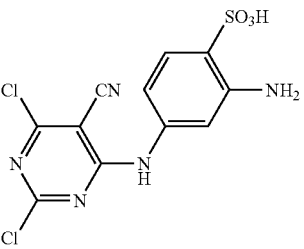 | 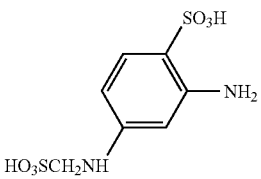 | yellow | 415 |

| Ex. | R—NH₂ | Coupling component | Shade | $\lambda_{max}$ (nm) |
|---|---|---|---|---|
| 26) | 4-[(2,6-difluoropyrimidin-4-yl)amino]-2-aminobenzenesulfonic acid derivative | 2-amino-4-(sulfomethylamino)benzenesulfonic acid | yellow | 412 |
| 27) | 4-[(5-chloro-2,6-difluoropyrimidin-4-yl)amino]-2-aminobenzenesulfonic acid derivative | 2-amino-4-(sulfomethylamino)benzenesulfonic acid | yellow | 415 |
| 28) | 2,3-dichloroquinoxaline-6-carboxamide derivative (4-sulfo-3-amino) | 2-amino-4-(sulfomethylamino)benzenesulfonic acid | yellow | 414 |
| 29) | 2,3-dichloroquinoxaline-6-carboxamide derivative (3-sulfo-4-amino) | 2-amino-4-(sulfomethylamino)benzenesulfonic acid | yellow | 412 |
| 30) | 2,3-dibromopropanoyl amino derivative | 2-amino-4-(sulfomethylamino)benzenesulfonic acid | yellow | 412 |
| 31) | 2-bromoacryloyl amino derivative | 2-amino-4-(sulfomethylamino)benzenesulfonic acid | yellow | 415 |

| Ex. | R—NH₂ | Coupling component | Shade | $\lambda_{max}$ (nm) |
|---|---|---|---|---|
| 32) | 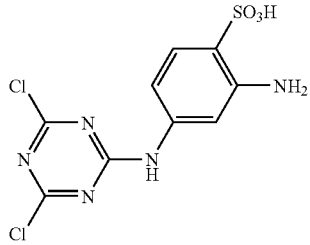 | 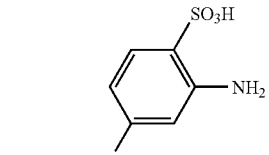 | yellow | 414 |

EXAMPLE 33

28.1 parts of 4-(2'-sulfatoethylsulfonyl)aniline are dissolved in 250 parts of water by neutralization of solid sodium bicarbonate. 4.2 parts of sodium fluoride are added to the solution, which is subsequently cooled to 0–5° C. by adding ice. Then, over the course of 5 minutes, 13.5 parts of trifluorotriazine are added dropwise, the pH initially falling rapidly and then leveling out at 4.5 to 5.0.

When the addition is complete, stirring is continued for 15 minutes. Subsequently, a neutralized solution of 18.8 parts of 2,4-diaminobenzenesulfonic acid in water is added dropwise and the pH is adjusted to 6.0–6.5. The reaction is completed by heating at from 30 to 35° C. followed by 60 minutes of stirring. The resulting solution is filtered and 6.9 parts of sodium nitrite are added.

The solution obtained is cooled to 10° C. by introduction of ice and added dropwise over 30 minutes to 100 parts of ice and 60 parts of concentrated hydrochloric acid (31%). This mixture is stirred for 1 hour and then the excess nitrite is destroyed by adding amidosulfuric acid.

The solution of the compound (VIa) described in Example 1 is then introduced dropwise to the acid diazotization.

A pH of from 2.0 to 2.5 is established. After an hour of subsequent stirring the mixture is adjusted to a pH of 5.5 using sodium carbonate solution and then is buffered with $NaH_2PO_4/Na_2HPO_4$. The resulting solution is concentrated by evaporation.

This gives a dye of the formula

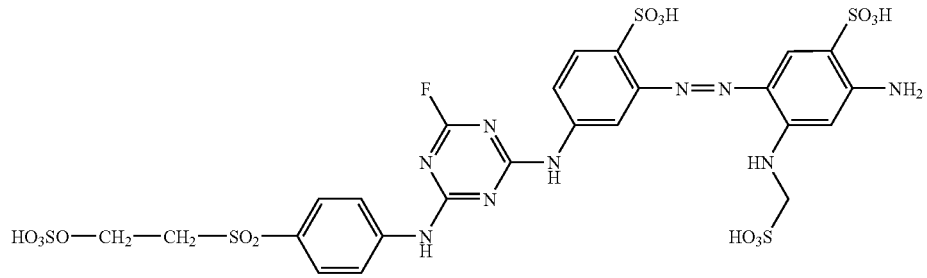

which dyes or prints cotton in yellow shades ($\lambda_{max}$=408 nm) with good fastness properties.

The dyes of Examples (35) to (47) are obtained analogously by diazotizing and subsequently coupling the amino compounds R-NH₂ indicated in the table below by the method indicated in Example 33.

| Ex. | R—NH₂ | Coupling component | Shade | $\lambda_{max}$ (nm) |
|---|---|---|---|---|
| 34) | 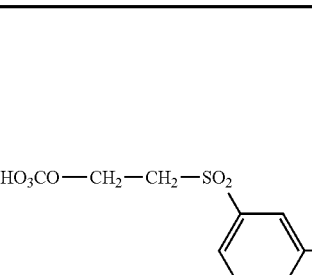 | 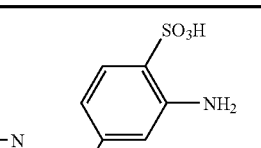 | yellow | 416 |

-continued

| Ex. | R—NH₂ | Coupling component | Shade | $\lambda_{max}$ (nm) |
|---|---|---|---|---|
| 35) | 4-amino-2-(2-sulfophenylamino)-6-fluoro-1,3,5-triazinyl linked to 4-sulfo-3-aminophenyl | 4-(sulfomethylamino)-2-aminobenzenesulfonic acid (HO₃SCH₂NH-C₆H₃(NH₂)-SO₃H) | yellow | 414 |
| 36) | 6-fluoro-1,3,5-triazine with 2-(1-sulfonaphth-2-ylamino) and 4-sulfo-3-aminophenylamino substituents | 4-(sulfomethylamino)-2-aminobenzenesulfonic acid | yellow | 419 |
| 37) | 6-chloro-1,3,5-triazine with 4-(2-sulfatoethylsulfonyl)phenylamino and 4-sulfo-3-aminophenylamino substituents (HO₃SO—CH₂—CH₂—SO₂—C₆H₄—NH—) | 4-(sulfomethylamino)-2-aminobenzenesulfonic acid | yellow | 419 |
| 38) | 6-chloro-1,3,5-triazine with 3-(2-sulfatoethylsulfonyl)phenylamino and 4-sulfo-3-aminophenylamino substituents | 4-(sulfomethylamino)-2-aminobenzenesulfonic acid | yellow | 421 |

| Ex. | R—NH₂ | Coupling component | Shade | $\lambda_{max}$ (nm) |
|---|---|---|---|---|
| 39) | 4-[[4-chloro-6-[(2-sulfophenyl)amino]-1,3,5-triazin-2-yl]amino]-2-aminobenzenesulfonic acid | 2-amino-4-(sulfomethylamino)benzenesulfonic acid | yellow | 422 |
| 40) | 4-[[4-chloro-6-[(1-sulfonaphthalen-2-yl)amino]-1,3,5-triazin-2-yl]amino]-2-aminobenzenesulfonic acid | 2-amino-4-(sulfomethylamino)benzenesulfonic acid | yellow | 422 |
| 41) | 4-[[4-fluoro-6-[N-phenyl-N-(2-(2-sulfatoethylsulfonyl)ethyl)amino]-1,3,5-triazin-2-yl]amino]-2-aminobenzenesulfonic acid | 2-amino-4-(sulfomethylamino)benzenesulfonic acid | yellow | 419 |
| 42) | 4-[[4-fluoro-6-[N-methyl-N-(2-(2-sulfatoethylsulfonyl)ethyl)amino]-1,3,5-triazin-2-yl]amino]-2-aminobenzenesulfonic acid | 2-amino-4-(sulfomethylamino)benzenesulfonic acid | yellow | 418 |

-continued
| Ex. | R—NH₂ | Coupling component | Shade | λ_max (nm) |
|---|---|---|---|---|
| 43) | 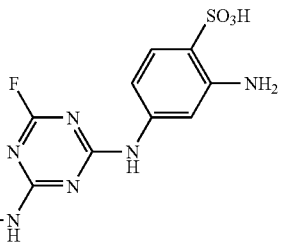 | 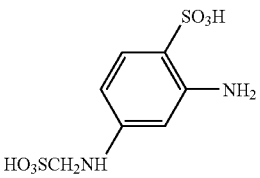 | yellow | 408 |
| 44) | 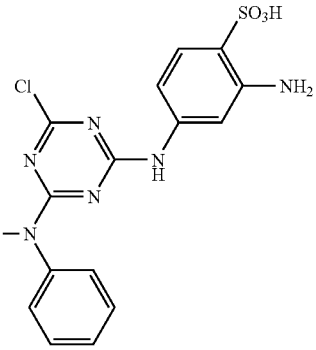 | 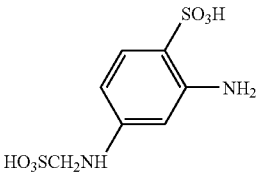 | yellow | 409 |
| 45) | 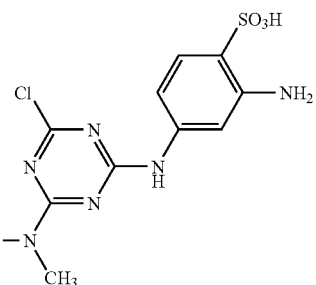 | 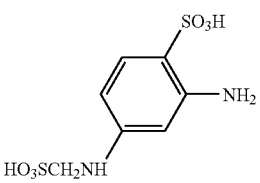 | yellow | 407 |
| 46) | 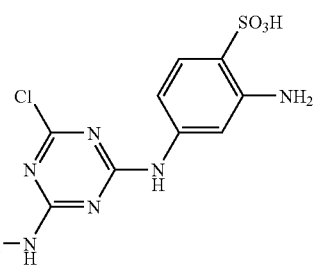 | 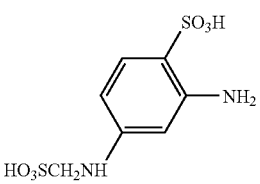 | yellow | 409 |

-continued

| Ex. | R—NH$_2$ | Coupling component | Shade | $\lambda_{max}$ (nm) |
|---|---|---|---|---|
| 47) | 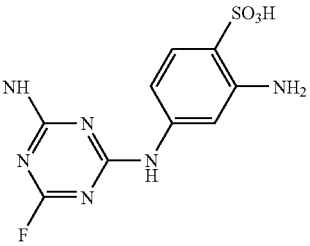 | 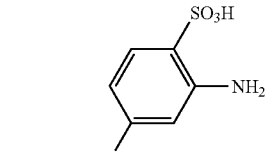 | yellow | 411 |

EXAMPLE 48

A suspension of 33.7 g of 4-(2'-sulfatoethylsulfonyl) aniline in 250 parts of water is admixed at 15° C. in succession with 0.5 g of a commercial dispersant and 25 parts of 31% strength hydrochloric acid and the mixture is stirred for 15 minutes thereafter. Then 16 parts of 40% strength aqueous sodium nitrite solution are added dropwise and the mixture is subsequently stirred for 60 minutes with the nitrite in excess.

Excess nitrite is then destroyed by adding 10% strength amidosulfuric acid. The dye solution described in Example 2 is then added to the diazonium salt suspension, followed by stirring for 15 minutes. The pH is then adjusted to 5.0–5.5 by adding 15% strength sodium carbonate solution, and coupling is completed.

The solution obtained is concentrated by evaporation to give a dye of the formula

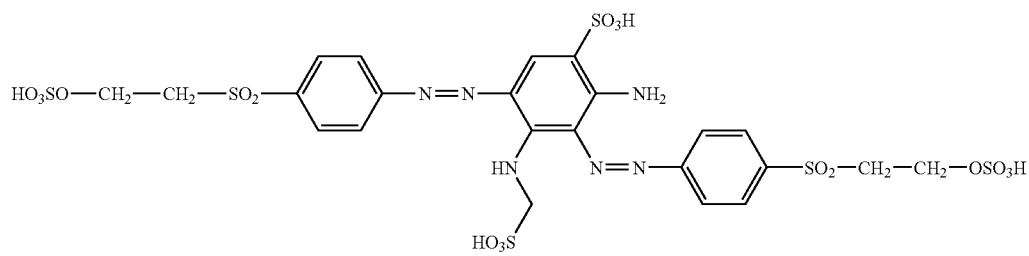

which dyes or prints cotton in a dull orange ($\lambda_{max}$=428 nm).

The dyes of the general formula

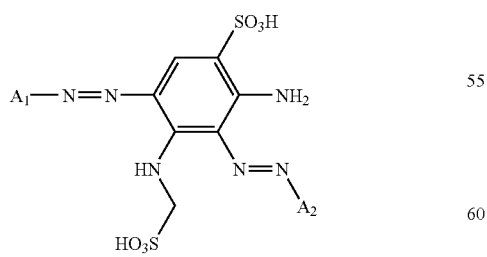

set out in the table below are obtained by reacting the compound prepared as in Example 1 first as described in Example 2 with an amine A$_1$-NH$_2$ and then as described in Example 48 with an amine A$_2$-NH$_2$.

| Ex. | $A_1-NH_2$ | $A_2-NH_2$ | Shade |
|---|---|---|---|
| 49) | ![structure: 4-sulfo-3-amino-phenyl linked via NH to fluorotriazine, other NH to 4-(2-sulfatoethylsulfonyl)phenyl] | ![structure: 4-(2-sulfatoethylsulfonyl)-2-aminobenzene with SO3H] | dull orange |
| 50) | ![structure: 4-sulfo-3-amino-phenyl linked via NH to fluorotriazine, other NH to 2-sulfophenyl] | ![structure: 4,5-dimethoxy-2-amino with 2-sulfatoethylsulfonyl] | dull orange |
| 51) | ![structure: 4-sulfo-3-amino-phenyl linked via NH to fluorotriazine, other NH to 1-sulfo-naphth-2-yl] | ![structure: 4-(2-sulfatoethylsulfonyl)-2-aminobenzene with SO3H] | dull orange |

-continued

| Ex. | A₁—NH₂ | A₂—NH₂ | Shade |
|---|---|---|---|
| 52) | 4-[(4-chloro-6-{[4-(2-sulfooxyethylsulfonyl)phenyl]amino}-1,3,5-triazin-2-yl)amino]-2-aminobenzenesulfonic acid structure | 4-amino-3-sulfo-phenyl-2-sulfatoethylsulfone | dull orange |
| 53) | 4-[(4-chloro-6-{[3-(2-sulfooxyethylsulfonyl)phenyl]amino}-1,3,5-triazin-2-yl)amino]-2-aminobenzenesulfonic acid structure | 4-amino-2,5-dimethoxyphenyl-2-sulfatoethylsulfone | dull orange |
| 54) | 4-[(4-chloro-6-{[2-sulfophenyl]amino}-1,3,5-triazin-2-yl)amino]-2-aminobenzenesulfonic acid structure | 3-amino-phenyl-2-sulfatoethylsulfone | dull orange |

-continued

| Ex. | A₁—NH₂ | A₂—NH₂ | Shade |
|---|---|---|---|
| 55) | ![structure]: aminobenzene with SO₃H and NH₂, linked via NH to chloro-triazine, linked via NH to naphthalene-SO₃H | ![structure]: benzene with SO₃H, NH₂ and —SO₂—CH₂—CH₂—OSO₃H | dull orange |
| 56) | ![structure]: aminobenzene with SO₃H and NH₂, linked via NH to fluoro-triazine bearing N(phenyl)(CH₂CH₂SO₂CH₂CH₂OSO₃H) | ![structure]: aminobenzene with SO₃H, NH₂ linked via NH to 5-chloro-2,6-difluoropyrimidine | dull orange |
| 57) | ![structure]: aminobenzene with SO₃H and NH₂, linked via NH to fluoro-triazine bearing N(CH₃)(CH₂CH₂SO₂CH₂CH₂OSO₃H) | ![structure]: benzene with SO₃H, NH₂ and —SO₂—CH₂—CH₂—OSO₃H | dull orange |

-continued

| Ex. | A₁—NH₂ | A₂—NH₂ | Shade |
|---|---|---|---|
| 58) | ![structure with triazine ring bearing F and NH-CH₂-CH₂-O-CH₂-CH₂-SO₂-CH=CH₂, linked via NH to phenyl with SO₃H and NH₂] | ![chloro-difluoropyrimidine linked via NH to phenyl with SO₃H and NH₂] | dull orange |
| 59) | ![chloro-triazine with N(phenyl)-CH₂-CH₂-SO₂-OSO₃H substituent, linked via NH to phenyl with SO₃H and NH₂] | ![HO₃SO—CH₂—CH₂—SO₂— linked to phenyl with NH₂ and SO₃H] | dull orange |
| 60) | ![chloro-triazine with N(CH₃)-CH₂-CH₂-SO₂-OSO₃H substituent, linked via NH to phenyl with SO₃H and NH₂] | ![HO₃SO—CH₂—CH₂—SO₂— linked to phenyl with NH₂] | dull orange |

| Ex. | A₁—NH₂ | A₂—NH₂ | Shade |
|---|---|---|---|
| 61) | 4-(H₂C=CH₂—SO₂—CH₂—CH₂—O—CH₂—CH₂—NH)-6-chloro-1,3,5-triazin-2-yl-amino on 2-amino-1-sulfophenyl | 4-amino-3-sulfo-phenyl-SO₂—CH₂—CH₂—OSO₃H | dull orange |
| 62) | 4-(HO₃SO—CH₂—CH₂—SO₂—(CH₂)₃—NH)-6-fluoro-1,3,5-triazin-2-yl-amino on 2-amino-1-sulfophenyl | 4-amino-2-methoxy-5-methoxy-phenyl-SO₂—CH₂—CH₂—OSO₃H | dull orange |
| 63) | 5-chloro-2,6-difluoropyrimidin-4-yl-amino on 2-amino-1-sulfophenyl | 5-chloro-2,6-difluoropyrimidin-4-yl-amino on 2-amino-1-sulfophenyl | dull orange |
| 64) | 5-fluoro-6-chloropyrimidin-4-yl-amino on 2-amino-1-sulfophenyl | 5-fluoro-6-chloropyrimidin-4-yl-amino on 2-amino-1-sulfophenyl | dull orange |

-continued

| Ex. | A₁—NH₂ | A₂—NH₂ | Shade |
|---|---|---|---|
| 65) | 4-amino-3-(2,6-difluoropyrimidin-4-ylamino)benzenesulfonic acid | 4-amino-N-(3-(2-(sulfooxy)ethylsulfonyl)phenyl)benzamide | dull orange |
| 66) | 4-amino-3-(6-fluoropyrimidin-4-ylamino)benzenesulfonic acid | 2-amino-5-(2-(sulfooxy)ethylsulfonyl)benzenesulfonic acid | dull orange |
| 67) | 4-amino-3-(2,6-dichloropyrimidin-4-ylamino)benzenesulfonic acid | 2-amino-5-(2,6-dichloropyrimidin-4-ylamino)benzenesulfonic acid | dull orange |
| 68) | 4-amino-3-(2,5,6-trichloropyrimidin-4-ylamino)benzenesulfonic acid | 2-amino-5-(2-(sulfooxy)ethylsulfonyl)benzenesulfonic acid | dull orange |

| Ex. | A₁—NH₂ | A₂—NH₂ | Shade |
|---|---|---|---|
| 69) | 3-amino-4-sulfophenylamino-5-cyano-2,6-dichloropyrimidine | 6-amino-1-(β-sulfatoethylsulfonyl)-3-sulfonaphthalene | dull orange |
| 70) | 4-amino-3-sulfophenylamino-2,6-difluoropyrimidine | 4-amino-3-(β-sulfatoethylsulfonyl)benzenesulfonic acid | dull orange |
| 71) | 4-amino-3-sulfophenylamino-5-chloro-2,6-difluoropyrimidine | 3-(β-sulfatoethylsulfonyl)aniline | dull orange |
| 72) | 3-amino-4-sulfophenyl carboxamido-2,3-dichloroquinoxaline | 6-amino-1-(β-sulfatoethylsulfonyl)-3-sulfonaphthalene | dull orange |

-continued

| Ex. | $A_1$—$NH_2$ | $A_2$—$NH_2$ | Shade |
|---|---|---|---|
| 73) | 4-amino-3-sulfo-phenyl amide of 2,3-dichloroquinoxaline-6-carboxylic acid | 3-amino-phenyl 2-sulfatoethyl sulfone | dull orange |
| 74) | 3-amino-4-sulfo-phenyl 2,3-dibromopropionamide | 2-amino-phenyl 2-sulfatoethyl sulfone | dull orange |
| 75) | 3-amino-4-sulfo-phenyl 2-bromoacrylamide | 2-amino-phenyl 2-sulfatoethyl sulfone | dull orange |
| 76) | 3-amino-4-sulfo-phenyl-(4,6-dichloro-1,3,5-triazin-2-yl)amine | 2-amino-1-sulfo-6-(2-sulfatoethylsulfonyl)naphthalene | dull orange |

-continued

| Ex. | $A_1-NH_2$ | $A_2-NH_2$ | Shade |
|---|---|---|---|
| 77) | 2-aminophenyl-SO$_2$-CH$_2$-CH$_2$-OSO$_3$H | 4-[(5,6-difluoropyrimidin-4-yl)amino]-2-amino-benzenesulfonic acid | dull orange |
| 78) | HO$_3$SO-CH$_2$-CH$_2$-SO$_2$-(3-aminophenyl) | 2-amino-6-(2-sulfatoethylsulfonyl)naphthalene-1-sulfonic acid | dull orange |
| 79) | HO$_3$SO-CH$_2$-CH$_2$-SO$_2$-(3-amino-4-methoxyphenyl) | 7-amino-1-(2-sulfatoethylsulfonyl)naphthalene | dull orange |
| 80) | HO$_3$SO-CH$_2$-CH$_2$-SO$_2$-(4-amino-5-methoxy-2-methylphenyl) | 4-[(5-chloro-2,6-difluoropyrimidin-4-yl)amino]-2-amino-benzenesulfonic acid | dull orange |

-continued

| Ex. | $A_1-NH_2$ | $A_2-NH_2$ | Shade |
|---|---|---|---|
| 81) | 2-methoxy-5-(β-sulfatoethylsulfonyl)-4-methoxyaniline derivative (HO₃SO—CH₂—CH₂—SO₂—Ar with OCH₃ and H₃CO substituents and NH₂) | 4-[(4-fluoro-6-(2-sulfophenylamino)-1,3,5-triazin-2-yl)amino]-2-aminobenzenesulfonic acid | dull orange |
| 82) | 4-(β-sulfatoethylsulfonyl)aniline with SO₃H and NH₂ | 4-[(2,6-difluoropyrimidin-4-yl)amino]-2-aminobenzenesulfonic acid | dull orange |
| 83) | 4-(β-sulfatoethylsulfonyl)aniline with SO₃H and NH₂ | 4-[(2,5,6-trichloropyrimidin-4-yl)amino]-2-aminobenzenesulfonic acid | dull orange |

-continued

| Ex. | A₁—NH₂ | A₂—NH₂ | Shade |
|---|---|---|---|
| 84) | 4-H₂N-C₆H₄-C(O)NH-C₆H₄-SO₂-CH₂-CH₂-OSO₃H | 3-amino-4-sulfophenyl-NH-C(O)-C(Br)=CH₂ | dull orange |
| 85) | 4-H₂N-C₆H₄-C(O)NH-(3-C₆H₄)-SO₂-CH₂-CH₂-OSO₃H | 7-amino-naphthalen-1-yl-SO₂-CH₂-CH₂-OSO₃H | dull orange |
| 86) | 3-H₂N-C₆H₄-C(O)NH-C₆H₄-SO₂-CH₂-CH₂-OSO₃H | 4-amino-3-sulfophenyl-SO₂-CH₂-CH₂-OSO₃H | dull orange |
| 87) | 3-H₂N-C₆H₄-C(O)NH-(3-C₆H₄)-SO₂-CH₂-CH₂-OSO₃H | 3-amino-4-sulfophenyl-NH-(5-chloro-2,6-difluoropyrimidin-4-yl) | dull orange |
| 88) | 4-amino-3-sulfophenyl-SO₂-CH₂-CH₂-OSO₃H | 4-H₂N-C₆H₄-SO₂-CH₂-CH₂-OSO₃H | dull orange |

-continued

| Ex. | $A_1-NH_2$ | $A_2-NH_2$ | Shade |
|---|---|---|---|
| 89) | (2-amino-1-sulfo-6-(2-sulfatoethylsulfonyl)naphthalene) | (4-[(4-fluoro-6-(2-sulfophenylamino)-1,3,5-triazin-2-yl)amino]-2-aminobenzenesulfonic acid) | dull orange |
| 90) | (2-amino-8-(2-sulfatoethylsulfonyl)naphthalene) | (2-amino-8-(2-sulfatoethylsulfonyl)naphthalene) | dull orange |
| 91) | (2-amino-8-(2-sulfatoethylsulfonyl)-6-sulfonaphthalene) | (4-[(2,5,6-trichloropyrimidin-4-yl)amino]-2-aminobenzenesulfonic acid) | dull orange |

EXAMPLE 92

17.3 parts of aniline-4-sulfonic acid are dissolved in 200 parts of water and acidified by adding 21 parts of 31% strength hydrochloric acid. Ice cooling to 10–15° C. is followed by dropwise addition of 13.2 parts of 40% strength sodium nitrite solution. With an excess of nitrite, stirring is conducted for 60 minutes. The excess is then reduced by adding a few drops of 10% strength amidosulfuric acid solution.

The solution obtained in accordance with Example 1 is then added to the diazonium salt suspension, the pH is adjusted to 4–5 by adding 15% strength sodium carbonate solution, and coupling is completed.

This gives the solution of a dye of the formula

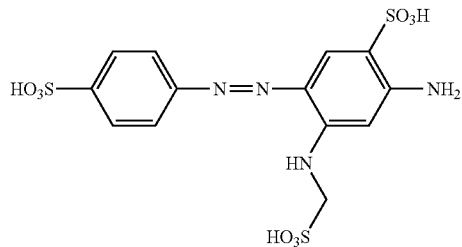

A suspension of 33.7 g of 4-(2'-sulfatoethylsulfonyl) aniline in 250 parts of water is admixed at 15° C. in succession with 0.5 g of a commercial dispersant and 25 parts of 31% strength hydrochloric acid and subsequently stirred for 15 minutes. Then 16 parts of 40% strength aqueous sodium nitrite solution are added dropwise and the mixture is subsequently stirred for 60 minutes with an excess of nitrite.

Excess nitrite is then destroyed by adding 10% strength amidosulfuric acid. The above dye solution is then added to the diazonium salt suspension and the mixture is stirred for 15 minutes. The pH is then adjusted to 5.0–5.5 by adding 15% strength sodium carbonate solution, and coupling is completed.

The solution obtained is concentrated by evaporation to give a dye of the formula which dyes or prints cotton in yellowish brown shades ($\lambda_{max}$=431 nm).

EXAMPLES 93 TO 135

Dull orange dyes of the formula

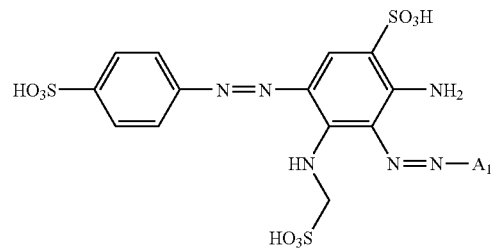

are obtained in analogy to the procedure described in Example 92 by diazotizing a reactive amine $A_1$-$NH_2$ in accordance with Examples 49 to 91 instead of 4-(2'-sulfatoethylsulfonyl) aniline and carrying out coupling in the second stage.

EXAMPLE 136

19.1 parts of aniline-4-sulfonic acid are dissolved in 220 parts of water and acidified by adding 23 parts of 31% strength hydrochloric acid. Ice cooling to 10–15° C. is followed by dropwise addition of 14.5 parts of 40% strength sodium nitrite solution. With an excess of nitrite, stirring is conducted for 60 minutes. The excess is then reduced by adding a few drops of 10% strength amidosulfuric acid solution.

The dye solution described in Example 2 is then added to the diazonium salt suspension, the pH is adjusted to 4–5 by adding 15% strength sodium carbonate solution, and coupling is completed.

The resulting solution is dried by evaporation to give the dye of formula

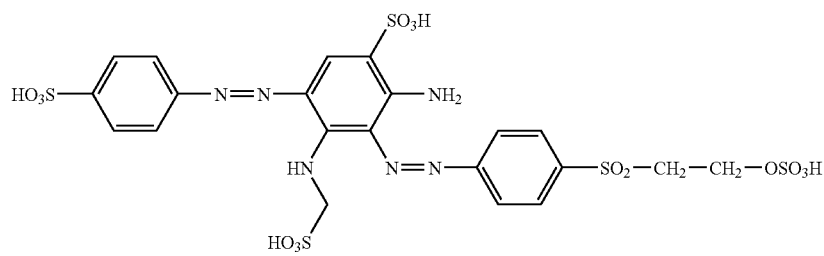

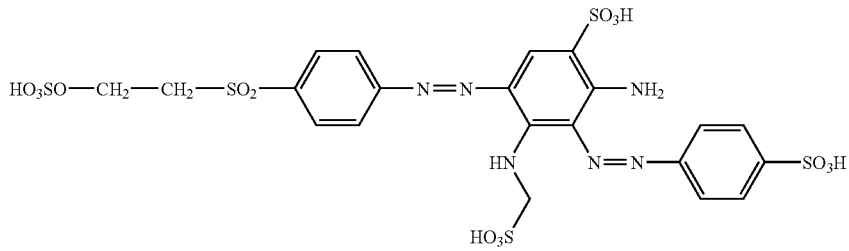

which dyes or prints cotton in orange-brown shades ($\lambda_{max}$=435 nm).

EXAMPLES 137 TO 181

Dull orange dyes of the formula

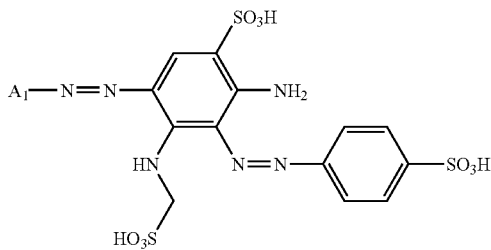

are obtained in analogy to the procedure described in Example 136 by using a solution of a dye according to Examples 3 to 47 instead of the dye solution described in Example 2.

EXAMPLE 182

30.3 parts of 2-naphthylamine-4,8-disulfonic acid are dissolved in 300 parts of water and acidified by adding 21 parts of 31% strength hydrochloric acid. Ice cooling to 10–15° C. is followed by dropwise addition of 13.2 parts of 40% strength sodium nitrite solution. With an excess of nitrite, stirring is conducted for 60 minutes. The excess is then reduced by adding a few drops of 10% strength amidosulfuric acid solution.

The solution obtained in accordance with Example 1 is then added to the diazonium salt suspension, the pH is then adjusted to 4–5 by adding 15% strength sodium carbonate solution, and coupling is completed.

This gives the solution of a dye of the formula

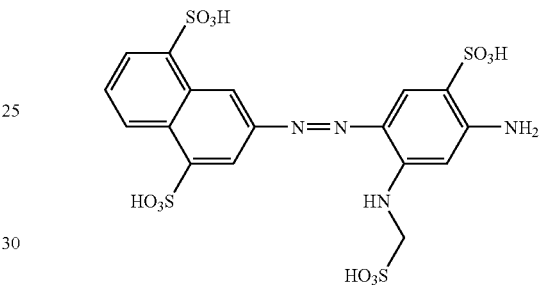

A suspension of 33.7 g of 4-(2'-sulfatoethylsulfonyl) aniline in 250 parts of water is admixed at 15° C. in succession with 0.5 g of a commercial dispersant and 25 parts of 31% strength hydrochloric acid and subsequently stirred for 15 minutes. Then 16 parts of 40% strength aqueous sodium nitrite solution are added dropwise and the mixture is subsequently stirred for 60 minutes with an excess of nitrite.

Excess nitrite is then destroyed by adding 10% strength amidosulfuric acid. The above dye solution is then added to the diazonium salt suspension and the mixture is stirred for 15 minutes. The pH is then adjusted to 5.0–5.5 by adding 15% strength sodium carbonate solution, and coupling is completed.

The solution obtained is concentrated by evaporation to give a dye of the formula

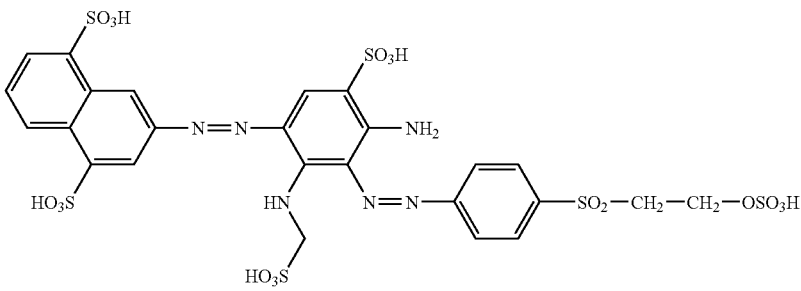

which dyes or prints cotton in yellowish brown shades ($\lambda_{max}$=439 nm).

EXAMPLES 183 TO 225

Dull orange dyes of the formula

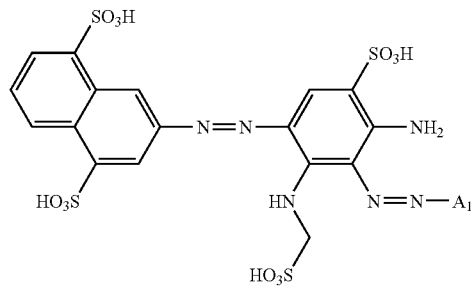

are obtained in analogy to the procedure described in Example 182 by diazotizing a reactive amine $A_1$-$NH_2$ in accordance with Examples 49 to 91 instead of 4-(2'-sulfatoethylsulfonyl)ani and carrying out coupling in the second stage.

EXAMPLE 226

33.3 parts of 2-naphthylamine-4,8-disulfonic acid are dissolved in 350 parts of water and acidified by adding 25 parts of 31% strength hydrochloric acid. Ice cooling to 10–15° C. is followed by dropwise addition of 14.5 parts of 40% strength sodium nitrite solution. With an excess of nitrite, stirring is conducted for 60 minutes. The excess is then reduced by adding a few drops of 10% strength amidosulfuric acid solution.

The dye solution described in Example 2 is then added to the diazonium salt suspension, the pH is adjusted to 4–5 by adding 15% strength sodium carbonate solution, and coupling is completed.

The resulting solution is dried by evaporation to give the dye of formula which dyes or prints cotton in yellow to orange-brown shades ($\lambda_{max}$=429 nm).

EXAMPLES 227 TO 271

Dull orange dyes of the formula

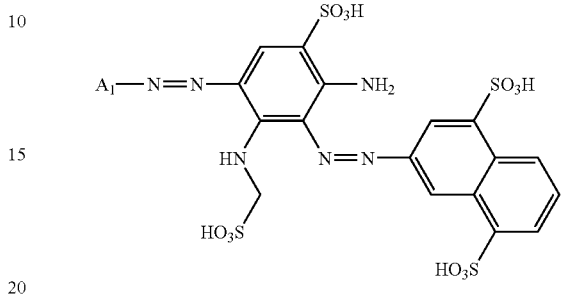

are obtained in analogy to the procedure described in Example 226 by using a solution of a dye according to Examples 3 to 47 instead of the dye solution described in Example 2.

EXAMPLE 272

A suspension of 61.8 g of 4-(2'-sulfatoethylsulfonyl) aniline in 500 parts of water is admixed at 15° C. in succession with 0.5 g of a commercial dispersant and 50 parts of 31% strength hydrochloric acid and subsequently stirred for 15 minutes. Then 32 parts of 40% strength aqueous sodium nitrite solution are added dropwise and the mixture is subsequently stirred for 60 minutes with an excess of nitrite.

Excess nitrite is then destroyed by adding 10% strength amidosulfuric acid. The solution obtained in accordance with Example 1 is then added to the diazonium salt suspension and the mixture is stirred for 15 minutes. The pH is then adjusted to 5.0–5.5 by adding 15% strength sodium carbonate solution, and coupling is completed.

The solution obtained is concentrated by evaporation to give a dye of the formula

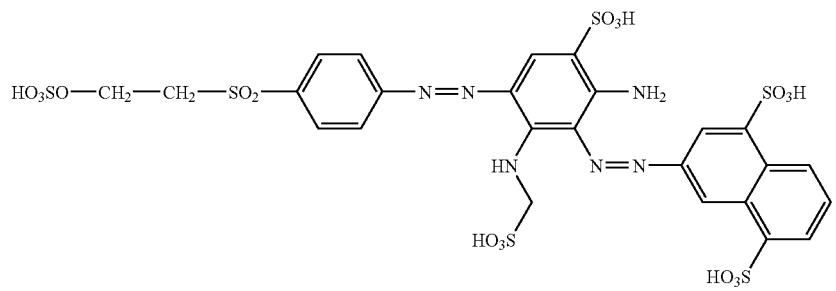

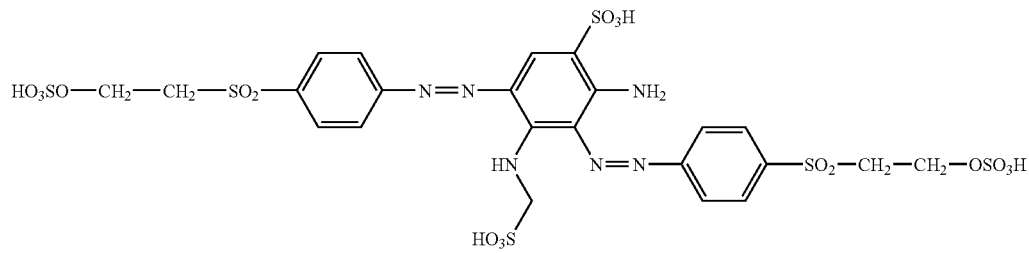

which dyes or prints cotton in a dull orange to orange shade ($\lambda_{max}$=428 nm).

EXAMPLES 273 TO 317

Dull orange dyes of the formula

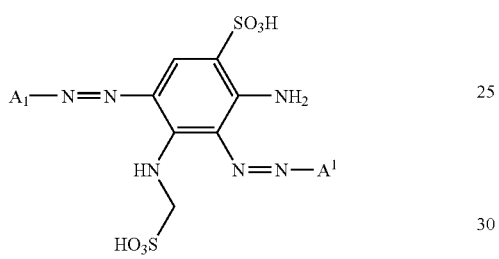

are obtained in analogy to the procedure described in Example 272 by diazotizing 2.2 equivalents of a reactive amine $A_1$-$NH_2$ in accordance with Examples 49 to 91 instead of 4-(2'-sulfatoethylsulfonyl)aniline and reacting the diazonium compound with one equivalent of the coupler from Example 1.

What is claimed is:

1. A dye of the general formula (I)

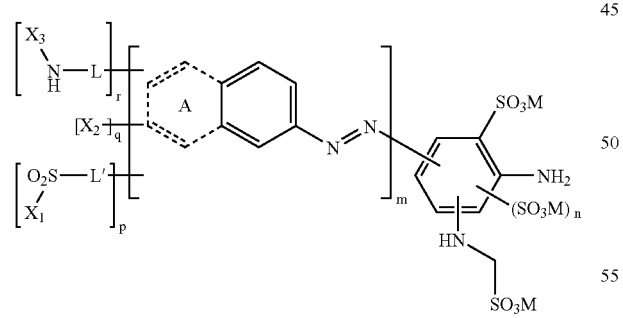

where
m is 1 or 2,
n is 0 or 1,
q is 0, 1, 2 or 3 and
p is 0, 1 or 2,
r is 0, 1 or 2, and
p+r is 1 or 2 and
$X_1$ is a radical —$CH_2CH_2Z$ or —CH=$CH_2$, Z being an alkali-eliminable group, M is hydrogen, ammonium, an alkali metal or the equivalent of an alkaline earth metal,
$X_2$ is alkyl, alkoxy, halogen, COOM or $SO_3M$,
L is a direct bond or alkylene,
L' is a direct bond or a group of the formula

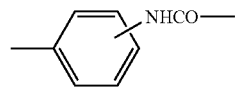

$X_3$ is a heterocyclic reactive group of the general formula (IIa) or (IIb)

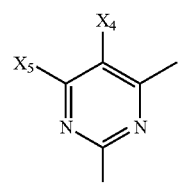

(IIa)

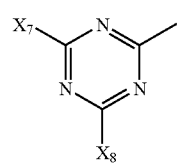

(IIb)

or a reactive group of the formula (IIc), (IId) or (IIe)

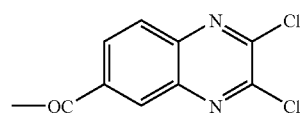

(IIc)

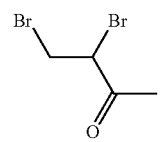

(IId)

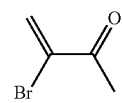

(IIe)

where
X$_4$ to X$_6$ independently are hydrogen or halogen, with the proviso that at least one radical X$_4$ to X$_6$ is halogen,
X$_7$ is halogen or X$_8$, and
X$_8$ is a substituent of the general formula (III)

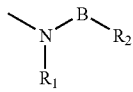
(III)

where
R$_1$ is hydrogen, alkyl or aryl,
B is alkylene, oxygen-interrupted alkylene, arylene or arylalkylene, and
R$_2$ is a radical SO$_3$M, SO$_2$-CH$_2$CH$_2$Z or SO$_2$-CH=CH$_2$, in which Z is as defined above
and the ring labeled A is either absent or present.

2. A dye as claimed in claim 1, wherein X$_2$ is C$_1$–C$_4$ alkyl, C$_1$–C$_4$ alkoxy or SO$_3$M, M being as defined in claim 1.

3. A dye as claimed in claim 1, wherein X$_3$ is a group of the formula

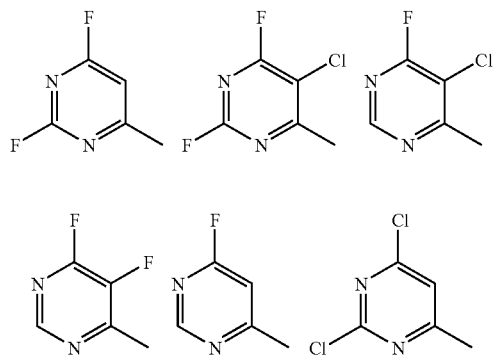

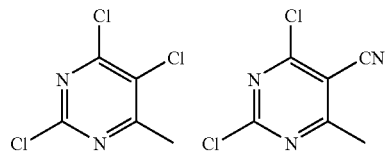

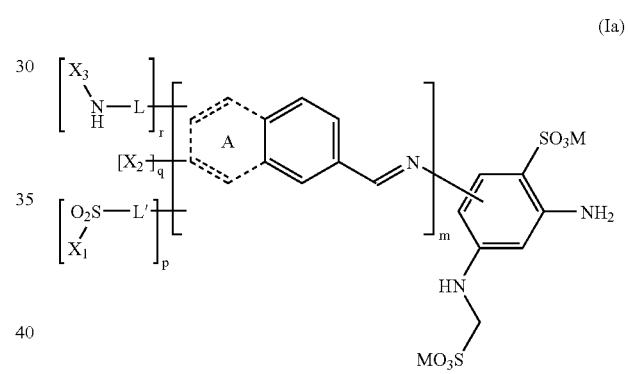

where
Hal' is chloro or bromo,
R$_1$' is hydrogen, methyl, ethyl or phenyl,
B' is ethylene, propylene or —CH$_2$CH$_2$—O—CH$_2$CH$_2$- and
R$_2$' is —SO$_2$CH$_2$CH$_2$OSO$_3$M or —SO$_2$CH=CH$_2$.

4. The dye as claimed in claim 1, wherein m is 1.

5. The dye as claimed in claim 1, wherein m is 2.

6. The dye as claimed in claim 1, corresponding to the general formula (Ia)

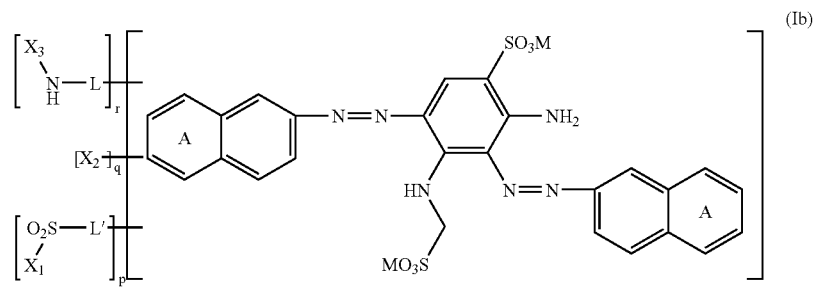
(Ia)

where X$_1$ to X$_3$, A, L, L', M, m, r, p and q are as defined in claim 1.

7. The dye as claimed in claim 1, corresponding to the general formula (Ib)

(Ib)

where $X_1$ to $X_3$, A, L, L', M, r, p and q are as defined in claim 1.
8. The dye as claimed in claim 1, corresponding to the general formula (Ic)
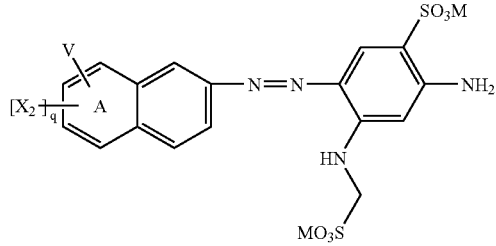
(Ic)
where M, A, $X_2$ and q are as defined in claim 1 and V is $X_3$-NH-L- or $X_1$-$O_2$S-L'-, where $X_1$, $X_3$, L and L' are as defined in claim 1.
9. The dye as claimed in claim 1, corresponding to one of the general formulae (Id) to (Iq)
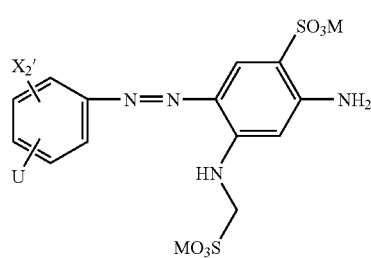
(Id)
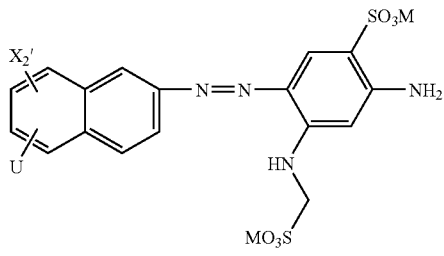
(Ie)
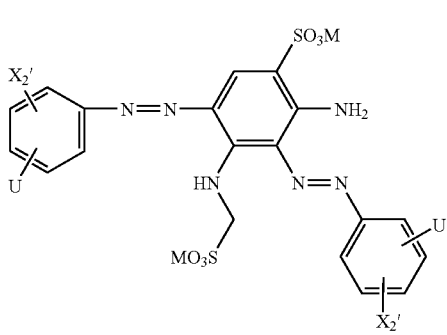
(If)
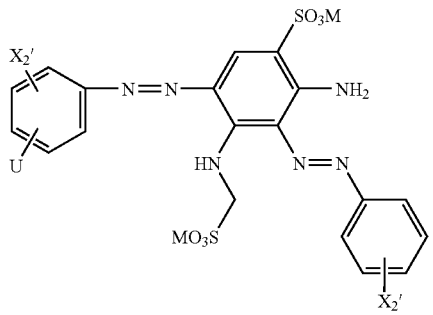
(Ig)
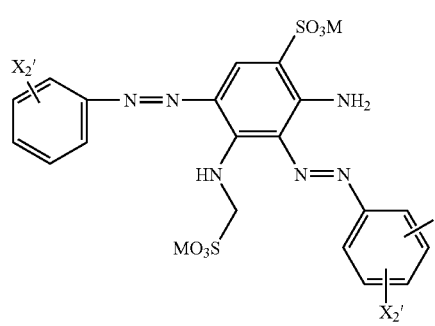
(Ih)
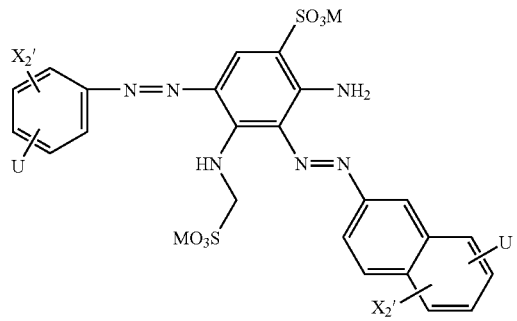
(Ii)
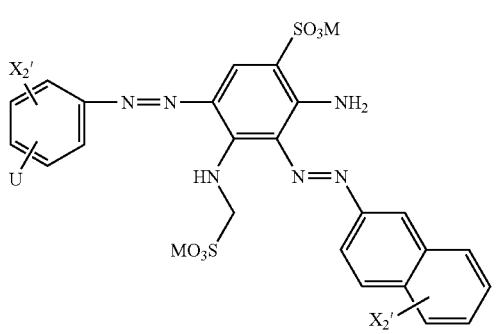
(Ij)

-continued
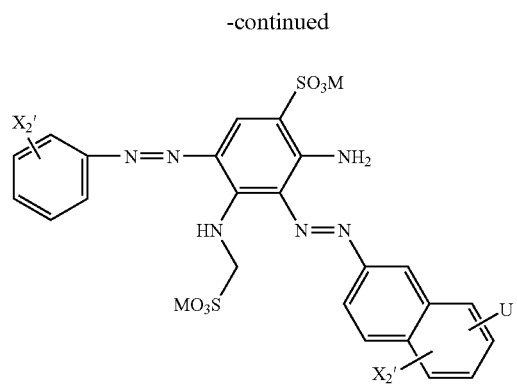
(Ik)
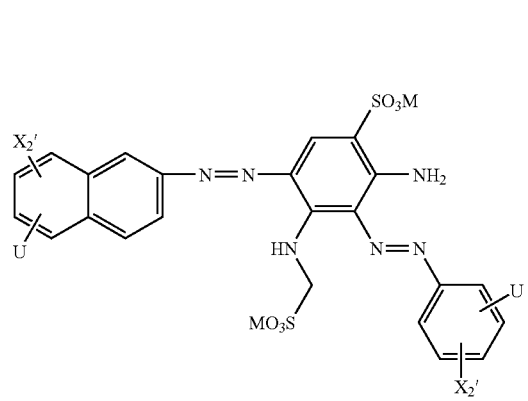
(Il)
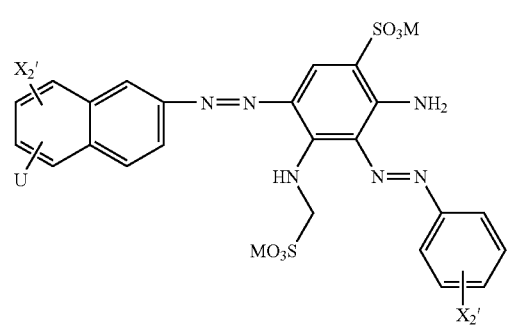
(Im)
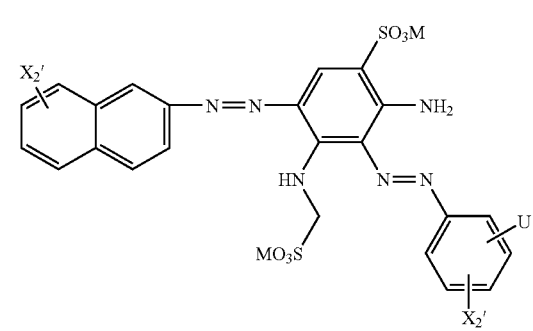
(In)
-continued
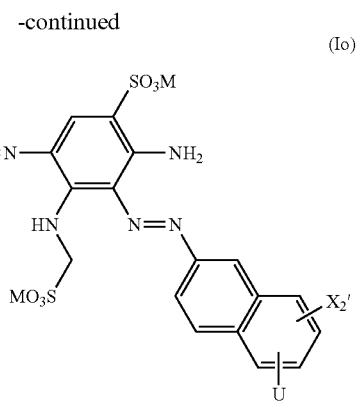
(Io)
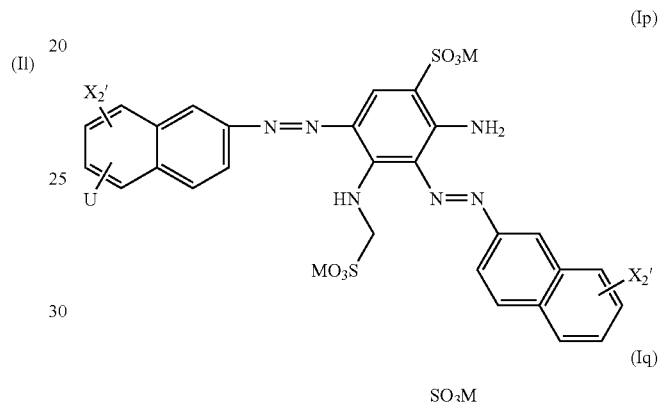
(Ip)
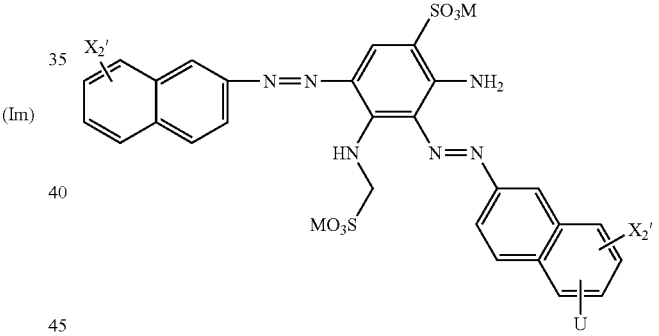
(Iq)
where in each case
  M is hydrogen or sodium and
  $X_2'$ is hydrogen, methyl, ethyl, methoxy, ethoxy, COOM or $SO_3M$ and
  U is —$SO_2CH_2CH_2OSO_3M$, —$SO_2CH=CH_2$ or —NH-U', in which M is hydrogen or sodium and U' is one of the formulae
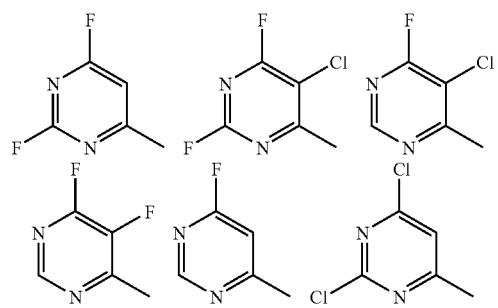

-continued

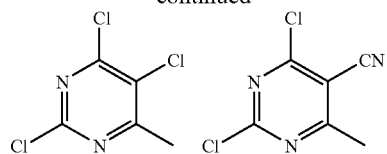

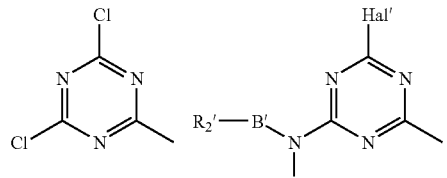

where
Hal' is chloro or fluoro,
$R_1'$ is hydrogen, methyl, ethyl or phenyl,
B' is ethylene, propylene or —$CH_2CH_2$—O—$CH_2CH_2$- and
$R_2'$ is —$SO_2CH_2CH_2OSO_3M$ or —$SO_2CH=CH_2$.

10. A process for preparing a dye of the general formula (I) as claimed in claim 1, which comprises diazotizing an aromatic amine of the general formula (V)

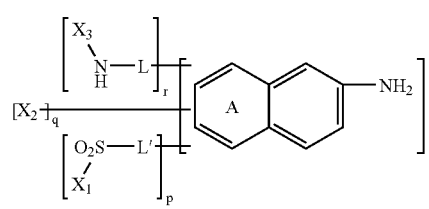

where p, q, r, L, $X_1$, $X_2$ and $X_3$ are as defined in claim 1 and coupling the diazonium compound with a compound of the general formula (VI)

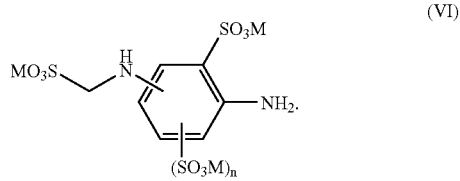

11. A process of dyeing of a hydroxyl- and/or carboxamido-containing material which comprises contacting the material with the dye of the general formula (I) as claimed in claim 1.

12. A process of dyeing of a hydroxyl- and/or carboxamido-containing material which comprises contacting the material with the dye of the general formula (I) as claimed in claim 9.

13. The process as claimed in claim 11, wherein the material is a fiber material.

14. The process as claimed in claim 12, wherein the material is a fiber material.

* * * * *

UNITED STATES PATENT AND TRADEMARK OFFICE
CERTIFICATE OF CORRECTION

PATENT NO.        : 7,109,313 B2                                              Page 1 of 4
APPLICATION NO. : 10/508121
DATED             : September 19, 2006
INVENTOR(S)       : Stefan Meier et al.

It is certified that error appears in the above-identified patent and that said Letters Patent is hereby corrected as shown below:

In Claim 9, column 74, lines 3 – 45,

"

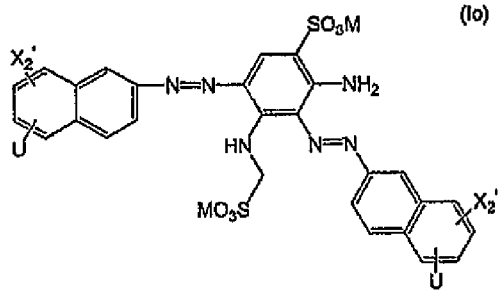

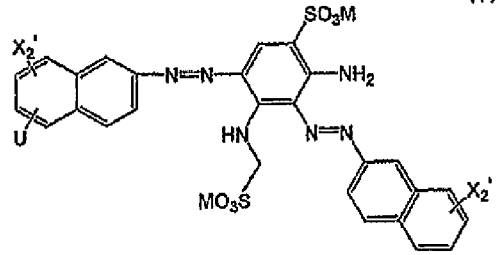

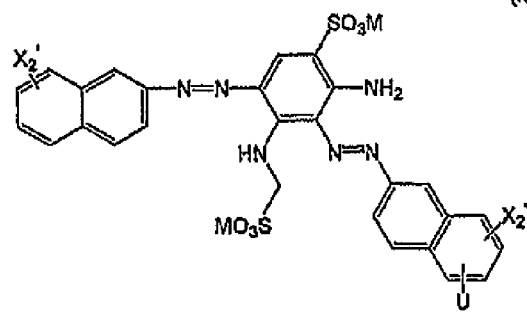

"

should read

UNITED STATES PATENT AND TRADEMARK OFFICE
CERTIFICATE OF CORRECTION

PATENT NO.        : 7,109,313 B2
APPLICATION NO. : 10/508121
DATED             : September 19, 2006
INVENTOR(S)       : Stefan Meier et al.

It is certified that error appears in the above-identified patent and that said Letters Patent is hereby corrected as shown below:

In Claim 9, column 74, lines 3 – 45, (cont'd)

--

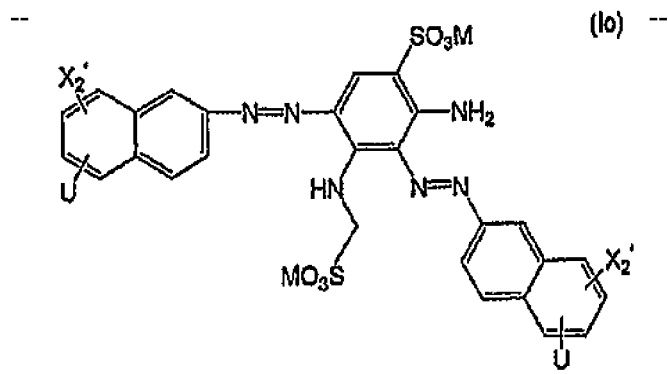

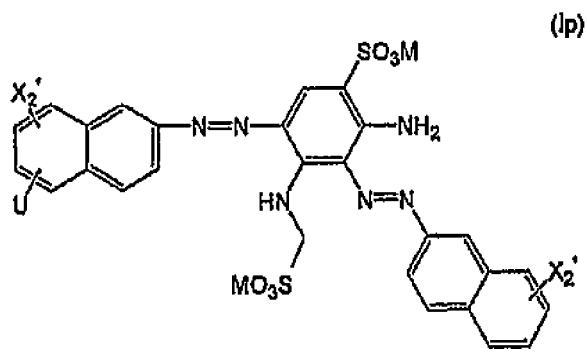

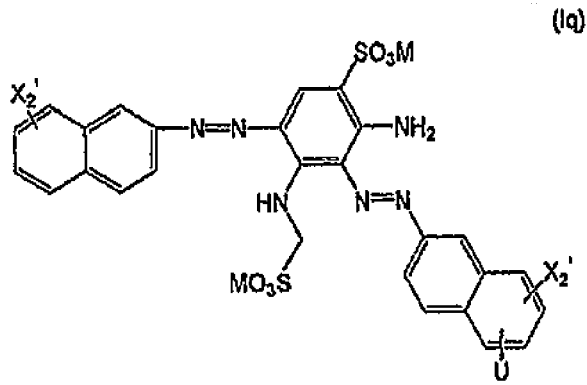

--

UNITED STATES PATENT AND TRADEMARK OFFICE
CERTIFICATE OF CORRECTION

PATENT NO. : 7,109,313 B2  Page 3 of 4
APPLICATION NO. : 10/508121
DATED : September 19, 2006
INVENTOR(S) : Stefan Meier et al.

It is certified that error appears in the above-identified patent and that said Letters Patent is hereby corrected as shown below:

In the Specification, column 8, lines 35-67

"

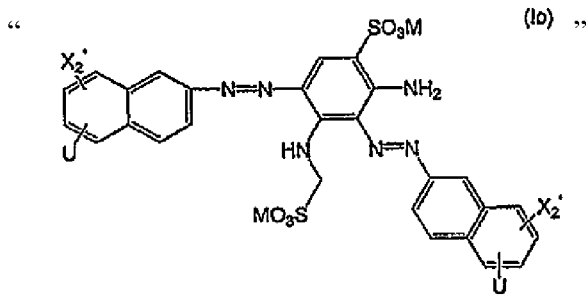

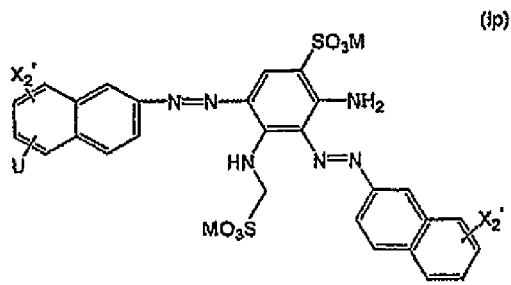

"

should read

--

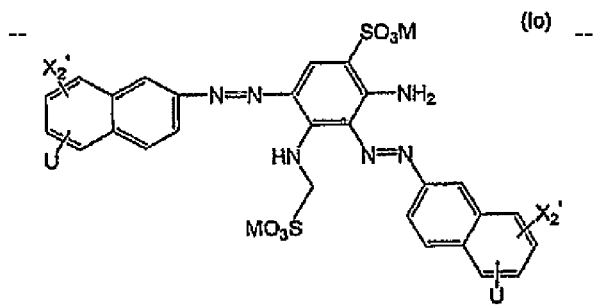

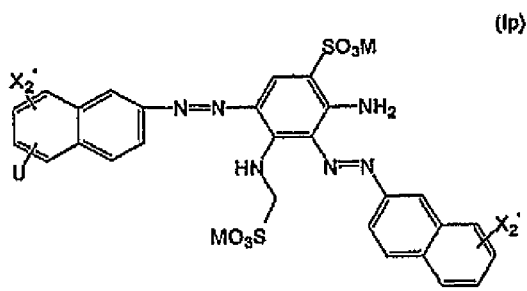

--

UNITED STATES PATENT AND TRADEMARK OFFICE
CERTIFICATE OF CORRECTION

PATENT NO.        : 7,109,313 B2
APPLICATION NO.   : 10/508121
DATED             : September 19, 2006
INVENTOR(S)       : Stefan Meier et al.

It is certified that error appears in the above-identified patent and that said Letters Patent is hereby corrected as shown below:

In the Specification, column 9 lines 3-17

"
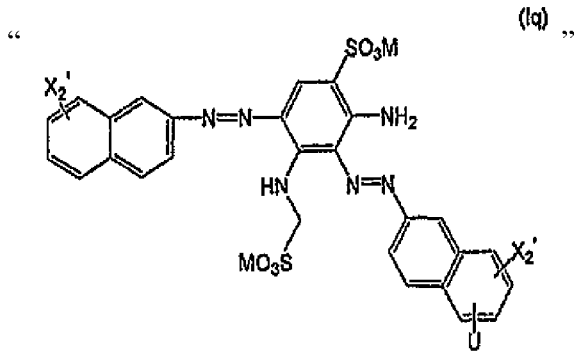
(Iq) "

should read

--
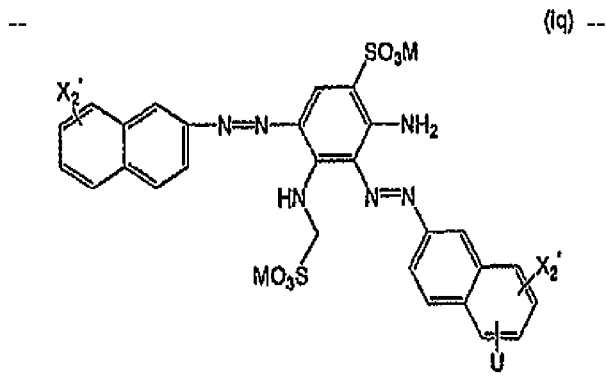
(Iq) --

Signed and Sealed this

Twelfth Day of June, 2007

JON W. DUDAS
*Director of the United States Patent and Trademark Office*